United States Patent
Ogawa et al.

(10) Patent No.: US 9,880,404 B2
(45) Date of Patent: Jan. 30, 2018

(54) OPTICAL WAVEGUIDE DEVICE AND METHOD OF MANUFACTURING THE SAME

(71) Applicants: FUJIKURA LTD., Tokyo (JP); AGENCY FOR SCIENCE, TECHNOLOGY AND RESEARCH, Connexis (SG)

(72) Inventors: Kensuke Ogawa, Sakura (JP); Kazuhiro Goi, Sakura (JP); Guo-Qiang Lo, Singapore (SG); Tsung-Yang Jason Liow, Singapore (SG); Xiaoguang Tu, Singapore (SG)

(73) Assignees: FUJIKURA LTD., Koto-ku, Tokyo (JP); AGENCY FOR SCIENCE, TECHNOLOGY AND RESEARCH, Connexis (SG)

( * ) Notice: Subject to any disclaimer, the term of this patent is extended or adjusted under 35 U.S.C. 154(b) by 0 days.

(21) Appl. No.: 15/284,971

(22) Filed: Oct. 4, 2016

(65) Prior Publication Data
US 2017/0023810 A1 Jan. 26, 2017

Related U.S. Application Data

(63) Continuation of application No. PCT/JP2014/060558, filed on Apr. 7, 2014.

(51) Int. Cl.
 *G02F 1/025* (2006.01)
 *G02F 1/015* (2006.01)
 (Continued)

(52) U.S. Cl.
 CPC ............ *G02F 1/025* (2013.01); *G02F 1/015* (2013.01); *G02B 2006/12097* (2013.01);
 (Continued)

(58) Field of Classification Search
None
See application file for complete search history.

(56) References Cited

U.S. PATENT DOCUMENTS

| | | |
|---|---|---|
| 7,085,443 B1 | 8/2006 | Gunn, III et al. |
| 2006/0008223 A1* | 1/2006 | Gunn, III ............... G02F 1/025 385/129 |

(Continued)

FOREIGN PATENT DOCUMENTS

| | | |
|---|---|---|
| DE | 10 2004 007 251 A1 | 9/2005 |
| WO | 2014/034074 A1 | 3/2014 |

OTHER PUBLICATIONS

Zhi-Yong Li, et al., "Silicon waveguide modulator based on carrier depletion in periodically interleaved PN junctions", Optics Express, Aug. 31, 2009, pp. 15947-15958, vol. 17, No. 18.

(Continued)

*Primary Examiner* — Mike Stahl
(74) *Attorney, Agent, or Firm* — Sughrue Mion, PLLC

(57) ABSTRACT

An optical waveguide device includes a substrate; a lower cladding disposed on the substrate; a rib waveguide including a slab disposed on the lower cladding and a single rib disposed on the slab contiguous to the slab; and an upper cladding disposed on the rib waveguide. The rib waveguide includes a first doped region having a first electric conductivity exhibiting a P-type electric conductivity across the rib and the slab and a second doped region being contiguous to the first doped region and having a second electric conductivity exhibiting an N-type electric conductivity across the rib and the slab.

10 Claims, 12 Drawing Sheets

(51) Int. Cl.
  *G02B 6/12* (2006.01)
  *G02F 1/21* (2006.01)
  *G02F 1/00* (2006.01)
(52) U.S. Cl.
  CPC .... *G02F 1/0018* (2013.01); *G02F 2001/0151* (2013.01); *G02F 2001/212* (2013.01)

(56) References Cited

U.S. PATENT DOCUMENTS

| | | |
|---|---|---|
| 2012/0099813 A1 | 4/2012 | Lee et al. |
| 2012/0183251 A1* | 7/2012 | Rasigade ................ G02F 1/025 |
| | | 385/2 |
| 2012/0189239 A1 | 7/2012 | Tu et al. |
| 2015/0244466 A1 | 8/2015 | Okamoto et al. |
| 2016/0202503 A1* | 7/2016 | Chen ...................... G02B 6/134 |
| | | 385/3 |

OTHER PUBLICATIONS

L. Liao et al, "40 Gbit/s silicon optical modulator for high-speed applications", Electronics Letters, Oct. 25, 2007, pp. 1196-1197, vol. 43, No. 22.

Xiaoguang Tu et al., "Fabrication of low loss and high speed silicon optical modulator using doping compensation method", Optics Express, Aug. 30, 2011, pp. 18029-18035, vol. 19, No. 19.

Xiaoguang Tu et al., "High Performance Silicon Modulator with Extremely Low Loss", Microwave Photonics, 2011 International Topical Meeting on & Microwave Photonics Conference, Oct. 18, 2011, pp. 117-120.

Communication dated Sep. 26, 2017 from the Japanese Patent Office in counterpart application No. 2016-558423.

* cited by examiner

OPTICAL WAVEGUIDE DEVICE AND METHOD OF MANUFACTURING THE SAME

CROSS REFERENCE TO RELATED APPLICATIONS

This application is a continuation application based on a PCT Patent Application No. PCT/JP2014/060558, filed Apr. 7, 2014.

BACKGROUND OF THE INVENTION

Field of the Invention

The present invention relates to an optical waveguide device that enables high-speed refractive index modulation with low optical loss and low driving voltage and a method of manufacturing the optical waveguide device.

Description of the Related Art

In recent years, the application of small-footprint optical integrated circuits such as planar optical waveguides to optical-fiber communication devices, in particularly, to optical transport equipment used for long-haul or metro-area wavelength-division multiplexing optical-fiber communication and optical interconnect equipment used in data centers and the like has been studied.

U.S. Pat. No. 7,085,443 (hereinafter referred to as PTL 1) discloses a single-mode silicon rib waveguide, in which refractive index is controlled by changing carrier density in PN junction formed in the transverse direction and the position of the PN junction boundary changes in a corrugated form along a direction of light propagation in the core of the optical waveguide.

Zhi-Yong Li, Dan-Xia Xu, W. Ross McKinnon, Siegfried Janz, Jens H. Schmid, Pavel Cheben and Jin-Zhong Yu, "Silicon waveguide modulator based on carrier depletion in periodically interleaved PN junctions", Optics Express vol. 17, no. 18, pp. 15947-15958 (2009) (hereinafter referred to as NPL 1) discloses technical information about the optical characteristics of a silicon waveguide in a configuration similar to that of the silicon rib waveguide of PTL 1. NPL 1 reports that, in the configuration disclosed in PTL 1 and in an optical modulator consisting of a silicon optical waveguide having a similar configuration to the above-described configuration, Bragg reflection caused by the periodic profile of the refractive index is negligible. Furthermore, NPL 1 discloses design exemplification of an optical modulator operating at a longer wavelength than the Bragg wavelength.

United States Patent Application, Publication No. 2012/0189239 (hereinafter referred to as PTL 2) discloses an optical modulator in which optical loss is reduced by using a configuration in which the depletion region in the PN junction is sandwiched between the first and second intrinsic regions. The first and second intrinsic regions are disposed contiguously to respective one of the two opposing side walls of the optical waveguide.

In the silicon rib waveguide disclosed in PTL 1 in which the position of the PN junction boundary changes in a corrugated line along a direction of the light propagation in the core of the optical waveguide, since the effective length of the PN junction increases, the driving voltage is reduced. However, in this case, there is a problem of an increase in optical loss due to an increase of optical absorption by carriers. In addition, there is another problem that it is not possible to reduce parasitic capacitance caused by the fringe electric fields from slab regions existing in side sections of the rib waveguide and high-speed operation is impaired. Therefore, in a case in which the above-described silicon rib waveguide is used, high-speed refractive index modulation with low optical loss is difficult.

In a design based on NPL 1, when a rib waveguide having a corrugated distribution profile in high refractive index contrast is used, return loss is decreased due to Bragg reflection and optical feedback to a laser light source generating incident light to the optical modulator is significant and mode hopping is generated, whereby the laser light source becomes unstable. As a result, there is a problem that it is not possible to generate stabilized optical modulation signals.

In the optical modulator disclosed in PTL 2, when the driving voltage is reduced, the refractive index modulation degrades. Therefore, there is a problem that it is not possible to reduce the driving voltage. Furthermore, in PTL 2, there are additional problems that the influence of fabrication error is significant and it is not possible to provide an optical modulator with small quality variation.

As described above, an object of the invention is to realize an optical waveguide device that is suitable for small-footprint optical integrated circuits such as an optical modulator enabling high-speed refractive index modulation with low optical loss and low driving voltage and allows only small quality variations for application to optical-fiber communication devices, in particularly, to optical transport equipment used for long-haul or metro-area wavelength-division multiplexing optical-fiber communication and optical-interconnect equipment used in data centers and the like.

SUMMARY

An optical waveguide device according to a first aspect of the present invention includes a substrate; a lower cladding disposed on the substrate; a rib waveguide including a slab disposed on the lower cladding and a single rib disposed on the slab contiguous to the slab; and an upper cladding disposed on the rib waveguide, wherein the rib waveguide includes a first doped region having a first electric conductivity exhibiting a P-type electric conductivity across the rib and the slab and a second doped region being contiguous to the first doped region and having a second electric conductivity exhibiting an N-type electric conductivity across the rib and the slab, a boundary between the first doped region and the second doped region provides a PN junction formed in a direction perpendicular to a surface of the substrate and is disposed in a corrugated line in a propagating direction of guided light in the rib waveguide in a plan view of the substrate, and the rib waveguide includes at least one of a first low conductive region being contiguous to an opposite side of the second doped region in the rib and exhibiting lower electric conductivity than the second doped region and a second low conductive region being contiguous to an opposite side of the first doped region in the rib and exhibiting lower electric conductivity than the first doped region. At least one of the first and second low conductive regions may be an intrinsic region.

In a case that the rib waveguide includes the first low conductive region, a third doped region being contiguous to the second doped region and the first low conductive region and having the second electric conductivity may be disposed in a region immediately below the first low conductive region on the slab, a fourth doped region having the second electric conductivity may be disposed contiguous to the third doped region in a part of the slab in which the rib is not present on the slab, a carrier density in the first low conductive region may be lower than a carrier density in the third doped region, a carrier density in the third doped region may be lower than a carrier density in the second doped region, and a carrier density in the fourth doped region may be equal to or higher than the carrier density in the second doped region. In a case that the rib waveguide includes the second low conductive region, a seventh doped region being contiguous to the first doped region and the first low conductive region and having the first electric conductivity may be disposed in a region immediately below the second low conductive region of the slab, an eighth doped region having the first electric conductivity may be disposed contiguous to the seventh doped region in a part of the slab in which the rib is not present on the slab, a carrier density in the first low conductive region may be lower than a carrier density in the third doped region, a carrier density in the seventh doped region may be lower than the carrier density in the first doped region, and a carrier density in the eighth doped region may be equal to or higher than the carrier density in the first doped region.

In a case that the rib waveguide includes the first low conductive region, a width of the second doped region may be substantially constant in a propagating direction of the guided light. In a case that the rib waveguide includes the second low conductive region, a width of the first doped region may be substantially constant in the propagating direction of the guided light.

In a case that the rib waveguide does not include the second low conductive region, the first doped region may be extended up to a part of the slab in which the rib is not present on the slab in the same side with the first doped region with respect to the boundary. In a case that the rib waveguide does not include the first low conductive region, the second doped region may be extended up to a part of the slab in which the rib is not present on the slab in the same side with the second doped region with respect to the boundary.

The optical waveguide device may further include a first metal electrode disposed on the upper cladding. Also, a fifth doped region having the second electric conductivity may be disposed in the part of the slab in which the rib is not present on the slab in the same side with the second doped region with respect to the boundary, and the fifth doped region and the first metal electrode may be connected to each other through a first through-hole via.

The optical waveguide device may further include a second metal electrode disposed on the upper cladding. Also, a sixth doped region having the first electric conductivity may be disposed in the part of the slab in which the rib is not present on the slab in the same side with the first doped region with respect to the boundary, and the sixth doped region and the second metal electrode may be connected to each other through a second through-hole via.

The optical waveguide device may include a first rib waveguide and a second rib waveguide both of which constitute the two rib waveguides disposed parallel along a width direction of the optical waveguide device.

A part of the slab in the first rib waveguide closer to the second rib waveguide than the rib in the first rib waveguide may be connected to a third metal electrode disposed on the upper cladding through a third through-hole via, and a part of the slab in the second rib waveguide closer to the first rib waveguide than the rib in the second rib waveguide may be connected to a fourth metal electrode disposed on the upper cladding through a fourth through-hole via.

A part of the slab in the first rib waveguide closer to the second rib waveguide than the rib in the first rib waveguide and a part of the slab in the second rib waveguide closer to the first rib waveguide than the rib in the second rib waveguide may be connected electrically to a common fifth metal electrode disposed on the upper cladding through the third through-hole via and the fourth through-hole via respectively.

A manufacturing method for the optical waveguide device according to a second aspect of the present invention includes a resist production step of, in a case that the rib waveguide includes the first low conductive region but does not include the second low conductive region, forming a first resist having a resist side wall disposed in a corrugated shape in the propagating direction of the guided light in the rib waveguide on a horizontal surface in a location serving as a boundary between the first low conductive region and the second doped region, covering a region serving as the second doped region, and exposing a region serving as the first low conductive region, in a case in which the rib waveguide includes the second low conductive region but does not include the first low conductive region, forming a second resist having a resist side wall disposed in a corrugated shape in the propagating direction of the guided light in the rib waveguide on a horizontal surface in a location serving as a boundary between the second low conductive region and the first doped region, covering a region serving as the first doped region, and exposing a region serving as the second low conductive region, and, in a case in which the rib waveguide includes the first low conductive region and the second low conductive region, producing the first resist or the second resist; and a resist trimming step of trimming the first resist or the second resist after the resist production step, thereby forming a resist having a resist side wall disposed in a corrugated shape in the propagating direction of the guided light in the rib waveguide on a horizontal surface in a location serving as the PN junction on a plan view of the substrate.

According to the optical waveguide device according to the above-described aspect, it is possible to realize an optical waveguide device that is suitable for a small-footprint optical integrated circuit such as an optical modulator enabling high-speed refractive index modulation with low optical loss and low driving voltage and allows only small quality variation for applications to optical fiber communication devices, in particular, optical transport equipment used for long-haul or metro-area wavelength-division multiplexing optical-fiber communication and optical-interconnect equipment used in data centers and the like.

DESCRIPTION OF THE PREFERRED EMBODIMENTS

Figure 1:
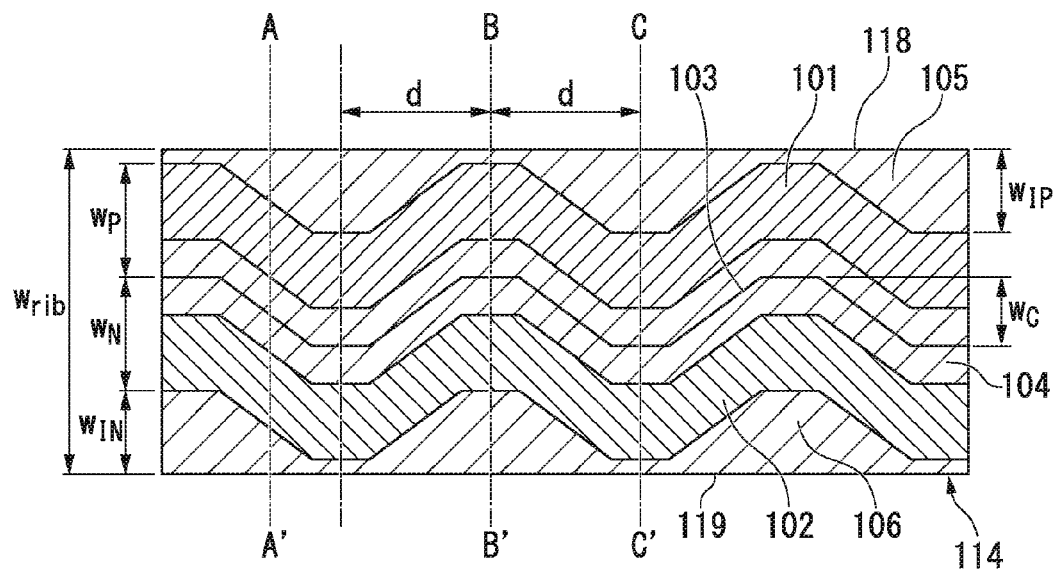
FIG. 1 is a top view illustrating an example of a rib on a rib waveguide.

The configuration and principle of an optical waveguide device preferable for high-speed refractive index modulation with low optical loss and low driving voltage will be described. FIG. 1 schematically illustrates a top view of a rib on a rib waveguide (core) that constitutes a part of the optical waveguide device. A cross-sectional view of the optical waveguide device including the rib waveguide is schematically illustrated in FIG. 2.

Figure 2:
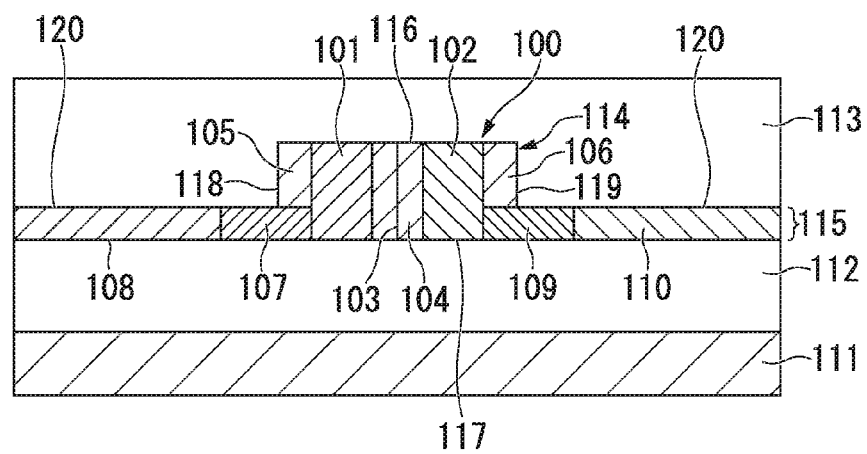
FIG. 2 is a schematic cross-sectional view of an optical waveguide device including the rib waveguide in a vertical surface including an alternate long and short dash line AA' in FIG. 1.

As illustrated in FIG. 2, a rib waveguide 100 is formed on a flat planar substrate 111. In the present embodiment, a direction in parallel to the surface of the substrate is defined as a horizontal direction, a planar surface in parallel to the surface of the substrate is defined as a horizontal surface, a direction orthogonal to the surface of the substrate is defined as a vertical direction, and a planar surface orthogonal to the surface of the substrate is defined as a vertical surface. Additionally, a direction in parallel to the horizontal direction and orthogonal to the propagating direction of guided light is defined as a width direction.

The top view in FIG. 1 illustrates the configuration of a rib 114 in the rib waveguide 100 on the horizontal surface. For elements constituting the optical waveguide device, widths are measured in the horizontal direction, and heights are measured in the vertical direction respectively. The rib waveguide 100 is a waveguide core including the rib 114 and a slab 115, and is formed of crystalline silicon (Si). The rib 114 is a single protrusion (also called "a ridge") which extends in the propagating direction of guided light, and the rib 114 is disposed on the center part of the slab 115 in width direction. The rib waveguide can be formed by removing both sides of the rib in the width direction from the flat and uniform core by etching, etc. In case that the rib is formed of polycrystalline silicon, rib waveguide can be formed by depositing the polycrystalline silicon on the crystalline silicon having the thickness of the slab, and removing both sides of the polycrystalline silicon in the width direction by photolithography and etching.

Claddings around the rib waveguide 100, that is, a lower cladding 112 and an upper cladding 113 are formed of silicon dioxide, that is, silica ($SiO_2$). The width $w_{rib}$ of the rib 114 in the rib waveguide 100 is, for example, in a range of 500 nm to 600 nm. The propagating direction of guided light in the rib waveguide is the horizontal direction, and is a direction orthogonal to the width $w_{rib}$. The width $w_{rib}$ is constant in the propagating direction of the guided light.

As illustrated in FIG. 1, P region 101 doped with P-type dopants and N region 102 doped with N-type dopants are disposed in a corrugated distribution pattern in the propagating direction of guided light. In the embodiment, for example, boron and phosphorous are used as P-type dopant and N-type dopant respectively, but the dopants are not limited thereto, and other elements that can serve as P-type dopants (nitrogen, arsenic, antimony and the like) and other elements that can serve as N-type dopants (aluminum, indium and the like) may be used.

A half period of the corrugated pattern in the propagating direction of guided light is represented by d, and thus a period is represented by 2d. The width $w_P$ of the P region 101 and the width $w_N$ of the N region 102 are substantially constant in the propagating direction of the guided light respectively. A PN junction is formed at a boundary 103 between the P region 101 and the N region 102. As described below, the P region 101 and the N region 102 are present across a region of the rib 114 and the slab 115 immediately below the rib 114 in the rib waveguide 100. In the vertical direction, the P region 101 and the N region 102 are present from a top surface 116 of the rib 114 to a bottom surface 117 of the slab 115. In the horizontal direction, the total width of the P region 101 and the N region 102 is narrower than the width $w_{rib}$ of the rib 114. In addition, the P region 101 and the N region 102 extend in the propagating direction of guided light within a limited range in accordance with purposes such as refractive index modulation. The boundary 103 is formed from the top surface 116 of the rib 114 to the bottom surface 117 of the slab 115 in the vertical direction, and forms a corrugated line extending in the propagating direction of the guided light in the horizontal direction.

Reverse bias voltage is applied to the optical waveguide device of FIG. 1, and a depletion region 104 is present along the boundary 103 and extends toward the P region 101 and the N region 102 from the PN junction. The width of the depletion region 104 extending toward the P region 101 and the N region 102 increases in proportion to the absolute value of the reverse bias voltage. The range within which the position of the boundary 103 changes in a direction along $w_{rib}$ is denoted by the width $w_c$. Examples of the values of the widths are as follows: in a case in which $w_{rib}$ is 500 nm, $w_P$ is 120 nm, $w_N$ is 90 nm, and $w_c$ is 130 nm.

An intrinsic region 105 is a low conductive region having a lower electric conductivity than the P region 101. Also, the intrinsic region 106 is a low conductive region having a lower electric conductivity than the N region 102. It becomes possible to reduce optical loss and parasitic capacitance using an intrinsic region 105 having a reduced concentration of the P-type dopant (having a lower electric conductivity than the P region 101) and an intrinsic region 106 having a reduced concentration of the N-type dopant (having a lower electric conductivity than the N region 102). The intrinsic region 105 and the intrinsic region 106 extend in the horizontal direction along the propagating direction in a corrugation line. The period of the corrugation is equal to the periods of the P region 101 and the N region 102. The maximum width of the intrinsic region 105 is represented as $w_{IP}$, and the maximum width of the intrinsic region 106 is represented as $w_{IN}$. For example, both of $w_{IP}$ and $w_{IN}$ are 210 nm. In addition, in a case in which $w_{rib}$ is 600 nm, $w_C$ is 230 nm. However, the widths of the respective sections are not limited to the above-described example, and may be optimized with respect to of optical loss, driving voltage and operation speed as well as the dimensional accuracy of fabrication processes.

Due to limitations of fabrication accuracy, a maximum of approximately ±80 nm of fabrication error is produced in $w_P$, $w_N$, $w_{IP}$ and $w_{IN}$. To suppress performance variation and enhance mass productivity, it is preferable to optimize the fabrication processes and thus improve the fabrication accuracy, thereby suppressing the fabrication error to approximately ±40 nm or less. In an example of the invention, $w_P$ and $w_N$ are substantially constant in the propagating direction of the guided light. However, $w_P$ and $w_N$ are not always required to be constant, and $w_P$ and $w_N$ may be changed to make $w_{IP}$ and $w_{IN}$ substantially constant in the propagating direction of the guided light. In the corrugation of the position of the boundary of the PN junction, the above-described fabrication error is present at the positions of crests and troughs. At the positions of crests and troughs as well, the fabrication error is preferably approximately ±40 nm or less.

FIG. 2 schematically illustrates a schematic cross-sectional view of the optical waveguide device including the rib waveguide in the vertical surface including an alternate long and short dash line AA' in FIG. 1. The alternate long and short dash line AA' passes through one of those points at which the boundary 103 is positioned on the center of $w_{rib}$ on a straight axis along the propagating direction of the guided light, and is drawn in parallel to $w_{rib}$. FIG. 2 illustrates a part of constituents inside of the optical waveguide device including the rib waveguide 100, the substrate 111, the lower cladding 112 and the upper cladding 113, but does not illustrate metal electrodes and doped regions in contact with the metal electrodes. The lower cladding 112 is disposed on the substrate 111, the rib waveguide 100 is disposed on the lower cladding 112, and the upper cladding 113 is disposed on the rib waveguide 100. Crystalline Si is used for the substrate 111, and $SiO_2$ is used for the lower cladding 112 and the upper cladding 113. The lower cladding 112 and the upper cladding 113 are substantially planar.

The PN junction is formed on the boundary 103 between the P region 101 and the N region 102, and, under reverse bias voltage, the depletion region 104 is formed along the boundary 103 and extends toward the P region 101 and the N region 102 of the boundary 103. The rib 114 includes side walls 118 and 119 which are respectively disposed on both sides of the rib in the width direction. The intrinsic region 105 is disposed between a side wall 118 that is a side wall of the rib 114 closer to the P region 101 than to the N region 102 and the P region 101. The intrinsic region 105 is contiguous to the side wall 118 of the rib 114 in the rib waveguide 100. The intrinsic region 106 is disposed between a side wall 119 that is a side wall of the rib 114 closer to the N region 102 than to the P region 101 and the N region 102. The intrinsic region 106 is contiguous to the side wall 119 of the rib 114 in the rib waveguide 100.

As illustrated in FIG. 1, the intrinsic region 105 is contiguous to the P region 101, extends in a direction opposite to the PN junction away from the P region 101 in the rib 114, and is contiguous to the side wall 118. Similarly, the intrinsic region 106 is contiguous to the N region 102, extends in a direction opposite to the PN junction away from the N region 102 in the rib 114, and is contiguous to the side wall 119. That is, there are no doped regions between the intrinsic region 105 and the side wall 118, and between the intrinsic region 106 and the side wall 119. The carrier density can be changed discontinuously or continuously, in a single step or multiple steps between the intrinsic region 105 and the P region 101, and between the intrinsic region 106 and the N region 102.

A P− region 107 is disposed in the slab 115 below the intrinsic region 105. The P− region 107 is disposed in a region including the slab 115 immediately below the intrinsic region 105, and is contiguous to the P region 101 and the intrinsic region 105. The carrier density in the intrinsic region 105 is lower than the carrier density in the P− region 107. The electric conductivity of the P− region 107 is P-type, that is the same as the P region 101, and the carrier density in the P− region 107 is lower than the carrier density in the P region 101. A P region 108 is disposed in the slab 115 outside the P− region 107 (the opposite side to the P region 101). The P region 108 is contiguous to the P− region 107, but is not to the P region 101. The electric conductivity of the P region 108 is P-type, that is the same as the P region 101. The carrier density in the P region 108 is equal to the carrier density in the P region 101. The P region 108 is disposed in a part of the slab 115 in which the rib 114 is not present on the slab 115, and is contiguous to a top surface 120 of the slab 115.

On the other hand, an N− region 109 is disposed in the slab 115 below the intrinsic region 106. The N− region 109 is disposed in a region including the slab 115 immediately below the intrinsic region 106, and is contiguous to the N region 102 and the intrinsic region 106. The carrier density in the intrinsic region 106 is lower than the carrier density in the N− region 109. The electric conductivity of the N− region 109 is N-type, that is the same as the N region 102, and the carrier density in the N− region 109 is lower than the carrier density in the N region 102. An N+ region 110 is disposed in the slab 115 outside the N− region 109 (the opposite side to the N region 102). The N+ region 110 is contiguous to the N− region 109, but is not to the N region 102. The electric conductivity of the N+ region 110 is N-type, that is the same as the N region 102, and the carrier density in the N+ region 110 is higher than the carrier density in the N region 102. The N+ region 110 is disposed in a part of the slab 115 in which the rib 114 is not present on the slab 115, and is contiguous to the top surface 120 of the slab 115.

Similarly to the N+ region 110 disposed outside the N− region 109, it is also possible to dispose a P+ region having a higher carrier density than the carrier density in the P region 101 outside the P− region 107 instead of the P region 108. In addition, similarly to the P region 108 disposed outside the P− region 107, it is also possible to provide an N region having the same carrier density as the carrier density in the N region 102 outside the N− region 109 instead of the N+ region 110.

In the embodiment, one electric conductivity selected from the electric conductivity of the P-type dopant (p-type electric conductivity) and the electric conductivity of the N-type dopant (n-type electric conductivity) is defined as a first electric conductivity, and the other electric conductivity is defined as a second electric conductivity, both of which are different each other. In certain embodiments of the invention, in a single rib waveguide (core), a region having the first electric conductivity is disposed on the left side of the center of the rib in the width direction in the rib waveguide (core) in the horizontal direction, and a region having the second electric conductivity is disposed on the right side of the center of the rib in the width direction in the rib waveguide (core) in the horizontal direction respectively. In other embodiments, while the disposition is reversed in the horizontal direction (the width direction), the optical waveguide device including a single rib waveguide (core) obtains the same effect. In addition, even when the definitions of the first electric conductivity and the second electric conductivity are switched each other, the same effect can be obtained. That is, it does not make any difference whether the P-type electric conductivity is defined as the first conductivity and the N-type electric conductivity is defined as the second conductivity, or the N-type electric conductivity is defined as the first conductivity and the P-type electric conductivity is defined as the second conductivity.

Figure 13:
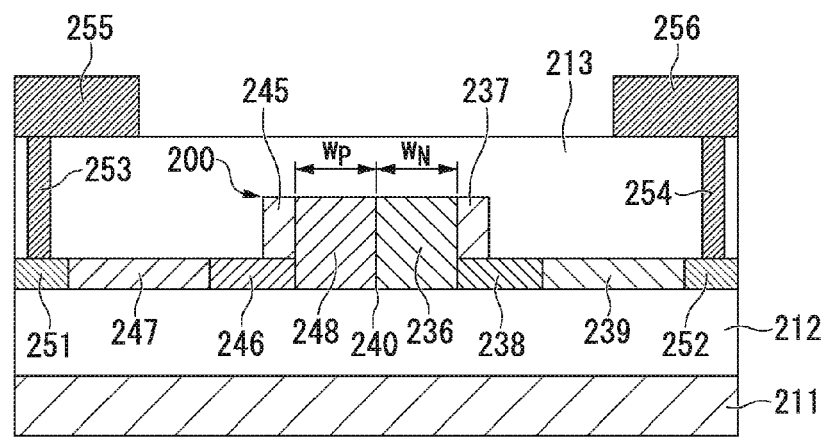
FIG. 13 is a schematic cross-sectional view of an optical waveguide device (including electrodes and the like) of Example 1.

A P++ region and an N++ region which have an extremely high carrier density and are suitable for electric connection with the metal electrodes are provided at outside parts away from the rib 114 in the horizontal direction (the width direction) in regions of the slab 115 on which the rib 114 is not present (refer to a P++ region 251 and an N++ region 252 in FIG. 13). Bias voltage is applied in the horizontal direction (the width direction) between the P++ region and the N++ region.

In the optical waveguide device having the boundary 103 along the corrugated PN junction schematically illustrated in FIG. 1, it is possible to extend the effective length of the PN junction in the propagating direction of the guided light compared with an optical waveguide device having a boundary along a straight PN junction, and thereby to reduce the driving voltage. Optical-mask alignment error in photolithography process to form the boundary 103 is averaged and thereby removed with the distribution of the corrugated PN junction. Therefore, it is possible to reduce performance variations in individual chips. When the effective length of the PN junction is extended, optical loss increases and parasitic capacitance increases, thereby the resistance-capacitance (RC) time constant increases and the operation speed decreases. Thus, it is necessary to introduce a mechanism eliminating the above-described disadvantages. According to the embodiment, it becomes possible to avoid both an increase in optical loss and an increase in parasitic capacitance as described below.

In regions adjacent to the side walls 118 and 119 on both sides of the rib 114 in the rib waveguide 100, the carrier density does not change substantially even when the bias voltage is changed. When these adjacent regions are formed as the intrinsic region 105 and the intrinsic region 106, it is possible to reduce the optical loss of the rib waveguide. In the vicinities of the sections immediately below the intrinsic region 105 and the intrinsic region 106 in the slab below the core, the carrier density only slightly changes as the bias voltage changes. When the vicinities are formed as the P− region 107 and the N− region 109 which have a low carrier density, it is possible to reduce the optical loss of the rib waveguide. When the bias voltage is applied, since the P− region 107 and the N− region 109 cause series resistances respectively, it is necessary to optimize the respective resistances to avoid impairment of high-speed operation.

Figure 3:
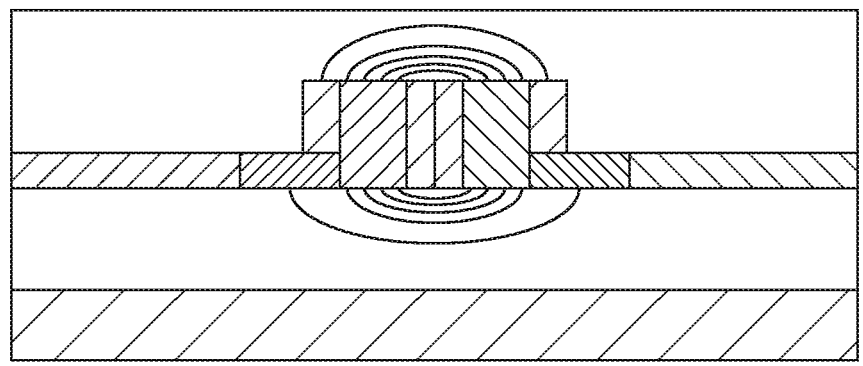
FIG. 3 is a schematic diagram of distribution of fringe electric fields in a cross-section of FIG. 2.

Coulomb interaction becomes weak, and thereby, the fringe capacitance between the intrinsic region 105 and the intrinsic region 106 and the fringe capacitance between the P− region 107 and the N− region 109 become negligible, when the carrier density is reduced. FIG. 3 schematically illustrates the distribution of fringe electric fields in the cross-section of FIG. 2. Curves indicate the lines of electric force corresponding to the fringe electric fields. To illustrate the lines of electric force clearer, the reference signs to constituents are not indicated. In regions having a dense distribution of the lines of electric force, Coulomb interaction is strong, and capacitance is high. The fringe capacitances in the P region 101 and the N region 102 become dominant. The fringe capacitance becomes parasitic capacitance, and impairs high-speed operation. When the intrinsic region 105, the intrinsic region 106, the P− region 107 and the N− region 109 are introduced into the rib waveguide (core), it is possible to reduce the parasitic capacitance, and the high-speed refractive index modulation of the optical waveguide device of the embodiment becomes possible.

Figure 4:
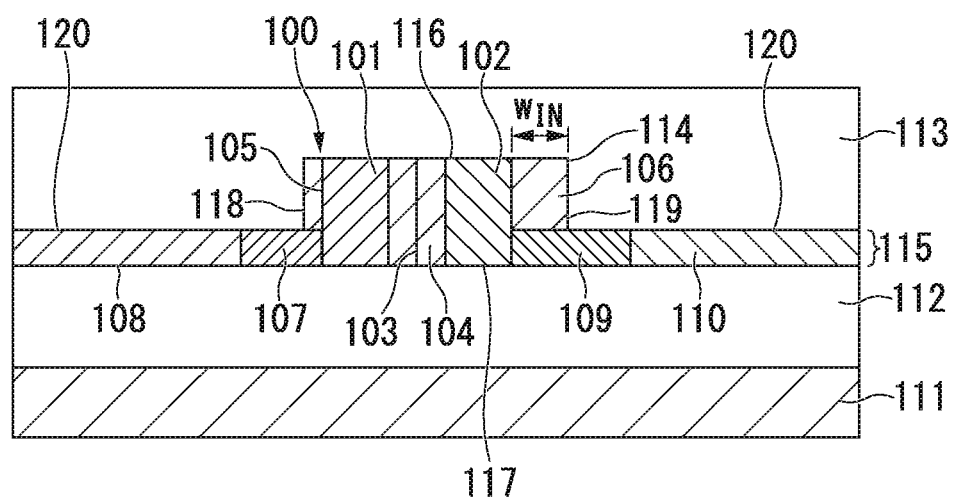
FIG. 4 is a schematic cross-sectional view of the optical waveguide device including the rib waveguide in a vertical surface including an alternate long and short dash line BB' in FIG. 1.

A schematic cross-sectional view of the rib waveguide in a vertical surface including an alternate long and short dash line BB' in FIG. 1 is illustrated in FIG. 4. In FIG. 4, the reference signs to the respective constituents are the same as in FIG. 2. The alternate long and short dash line BB' passes through a point at which the P region 101 is closest to the side wall 118 of the rib 114 on the opposite side of the boundary 103 within a range of the period 2d on the straight axis along the propagating direction of the guided light, and is drawn in parallel with $w_{rib}$. At this point, the width of the intrinsic region 106 becomes largest in a direction along the alternate long and short dash line BB'. The width is represented by $w_{IN}$.

Figure 5:
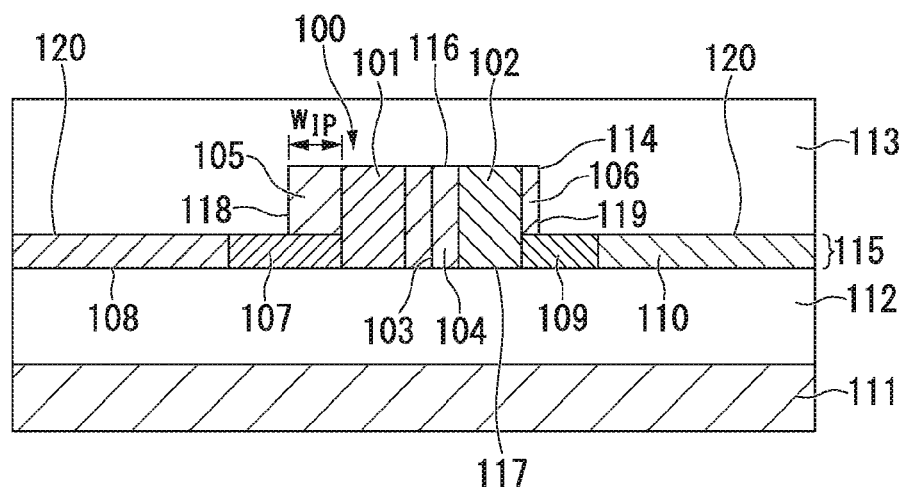
FIG. 5 is a schematic cross-sectional view of the optical waveguide device including the rib waveguide in a vertical surface including dashed line CC' in FIG. 1.

A schematic cross-sectional view of the rib waveguide in a vertical surface including an alternate long and short dash line CC' in FIG. 1 is illustrated in FIG. 5. In FIG. 5, the reference signs to the respective components are the same as in FIG. 2. The alternate long and short dash line CC' passes through a point at which the N region 102 is closest to the side wall 119 of the rib 114 on the opposite side of the boundary 103 within a range of the period 2d on a straight axis along the propagating direction of the guided light, and is drawn in parallel with $w_{rib}$. At this point, the width of the intrinsic region 105 becomes largest in a direction along the alternate long and short dash line CC'. The width is represented by $w_{IP}$.

When carriers are distributed by doping P-type or N-type dopant to Si, the refractive index decreases. In the rib waveguides having the configuration of FIGS. 1 to 5, since the refractive index is periodically distributed in the propagating direction of the guided light, it is not possible to neglect the effect of Bragg reflection. Since the periodic distribution of the dopant causes a periodic profile of a low refractive index in Si that is a base medium, Bragg grating having a negative refractive index contrast is formed. When a reflection spectrum is obtained using a transfer matrix method (TMM) assuming a square-waveform refractive index profile having abrupt interfaces in the propagating direction of the guided light, the reflection spectrum is expressed as illustrated in a graph in FIG. 6. Here, the Bragg wavelength is 1570.1 nm, and the length of the rib waveguide in the propagating direction of the guided light is 3 mm.

Figure 6:
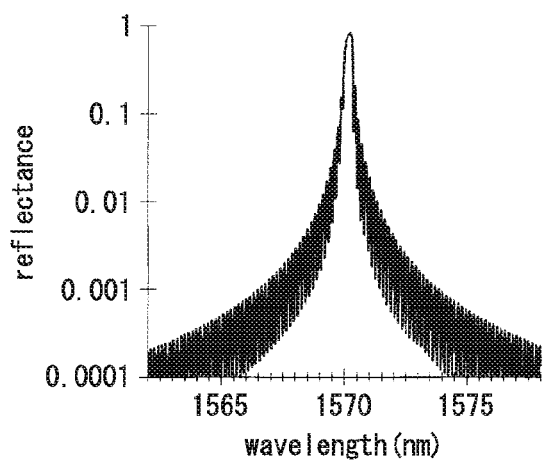
FIG. 6 is a graph of the reflection spectrum of the rib waveguide having configurations of FIGS. 1 to 5.

When the intrinsic region 105, the intrinsic region 106, the P– region 107 and the N– region 109 are introduced into the rib waveguide (core), the contrast of the periodic change of the refractive index in the rib waveguide becomes strong, and thereby, strong reflection is caused around the Bragg wavelength, and a stopband is generated as shown in FIG. 6. To obtain a return loss of 30 dB or more by suppressing reflection, it is necessary to separate the wavelength range to be used and the Bragg wavelength by 5 nm or more. In the corrugation profile of FIG. 1, while the period is 2d in the physical structure, the period of the refractive index profile projected on the axis along the propagating direction of the guided light, that is, the period $d_G$ of the Bragg grating becomes one of d and 2d, since $w_{IP}=w_{IN}$, and the effective refractive index in the vertical surface including the alternate long and short dash line BB' and the effective refractive index in the vertical surface including the alternate long and short dash line CC' are substantially the same. In the above-described derivation of the reflection spectrum using TMM, $d_G$ is set to d. Since the stopband corresponding to $d_G=2d$ is generated at a wavelength as twice as the wavelength of the stopband corresponding to $d_G=d$, the stopband is substantially negligible in a wavelength range in the vicinity of a stopband corresponding to $d_G=d$. However, depending on conditions, there are cases in which, a phenomenon, whereby influence of a higher order stopband is enhanced, occurs, and the period $d_G$ of the Bragg grating becomes equal to the period 2d in the physical structure, and d does not equal to the period $d_G$ of the Bragg grating, even when the intrinsic regions are disposed on the both sides of the rib in the width direction.

The optical waveguide device of the present invention can be preferably used in C and L bands that are optical communication wavelength bands. In this case, $d_G$ is adjusted so as to make the C and L bands correspond to a wavelength region in a short wavelength side of the stopband. The reason for using the short wavelength side of the stopband will be described below. When $w_{rib}$ is set to 500 nm, the height $h_{rib}$ from the bottom surface 117 of the slab 115 to the top surface 116 of the rib 114 is set to 220 nm, the height $h_{slab}$ from the bottom surface 117 of the slab 115 to the top surface 120 of the slab 115 is set to 95 nm, and the wavelength is set to 1550 nm, the effective refractive index $n_{eff}$ of the optical waveguide including the rib waveguide (Si core) and the SiO₂ claddings of the invention is 2.6. The change in $n_{eff}$ caused by a variation in $w_{rib}$ due to fabrication error is smaller than 1%. When a margin of 5 nm is added to the wavelength (1620 nm) of the long-wavelength end of the L band so as to obtain a wavelength of 1625 nm as the Bragg wavelength $\lambda_G$ to ensure a return loss of 30 dB or more, $d_G$ is 313 nm based on Formula (1).

$$d_G = \frac{\lambda_G}{2n_{eff}} \quad (1)$$

Since $d_G=d$, when d≥313 nm, it is possible to obtain a return loss of 30 dB or more in the C and L bands. In addition, when $w_{rib}$ is set to 600 nm, since $n_{eff}$ becomes larger than 2.6, $\lambda_G$ is further shifted toward longer wavelength side with the same d, and the return loss further increases. As a result, it is possible to suppress the Bragg reflection. When high-accuracy fabrication processes are employed, tolerance margin for the variation is not required, and the long-wavelength end of a desired wavelength band may be set to the above-described Bragg wavelength.

Figure 7:
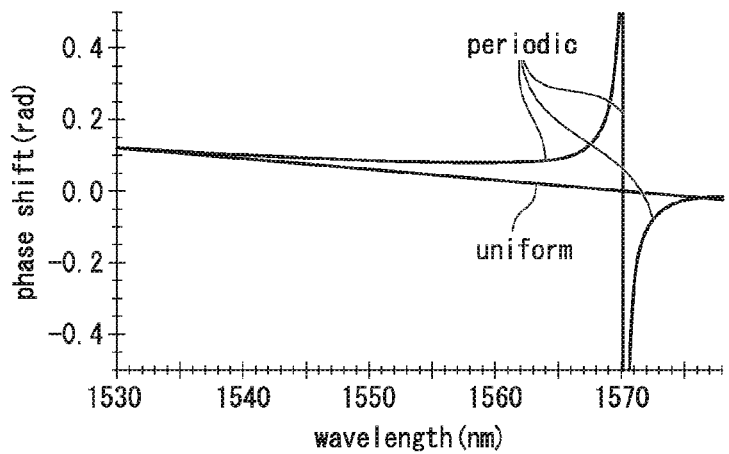
FIG. 7 is a graph of the wavelength dependencies of phase shift in a case in which the refractive index profile is periodic and a case in which the refractive index profile is uniform.

When the reflective index is periodically distributed in the propagating direction of the guided light, it is possible to reduce the wavelength dependence of phase shift as illustrated in FIG. 7. This is preferable when applied to wavelength-division multiplexing transmission. The optical characteristics in a case in which the refractive index is periodically distributed as illustrated in FIG. 7 (periodic) were derived using the same model as for the reflection spectrum of FIG. 6. For comparison, the characteristics of a case in which the boundary of the PN junction does not change in a corrugated line but remains in a uniform straight line (uniform) are plotted in FIG. 7. The wavelength dependence of the phase shift in the wavelength bands on both sides of the stopband is reduced. In the case of the uniform profile, the waveguide length necessary to generate a certain phase shift is proportional to the wavelength of the guided light, and therefore the phase shift decreases as the wavelength increases. In the case of the periodic profile, phase enhancement induced by the multiple reflection occurs, and the wavelength dependence of the phase shift is reduced. This is an advantage of the use of Bragg grating having a negative index contrast.

When the short wavelength side of the stopband is used for transmission, since the stopband corresponding to the period 2d is further separated from the wavelength band to be used, the use of the short wavelength side is effective in order to increase the return loss by reducing the Bragg reflection. Furthermore, when the short wavelength side is used, the Bragg wavelength becomes longer than the C and L bands. Therefore, d becomes larger with respect to the fabrication errors and the fabrication accuracy is improved, and thereby, it becomes easier to reduce quality variation.

Example 1

Figure 8:
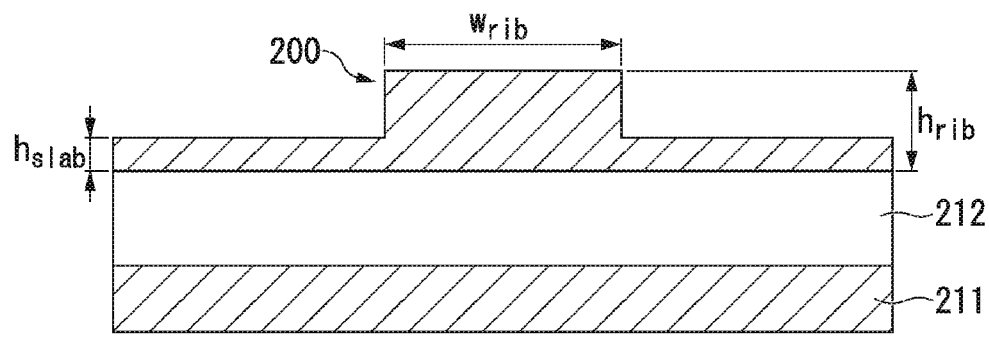
FIG. 8 is a cross-sectional view describing the formation of the rib waveguide.

The fabrication method and configuration of an optical waveguide device that functions based on the above-described configuration and principle will be described in detail using the cross-sectional configuration of FIG. 2 as an example. A rib waveguide 200 illustrated in FIG. 8 is fabricated on a silicon-on-insulator (SOI) layer using an SOI wafer through photolithography and etching. The substrate in an SOI wafer serves as a substrate 211, and a buried oxidized layer in the SOI wafer serves as a lower cladding 212. The thickness of the lower cladding 212 in the vertical direction is 2 μm.

Figure 9:
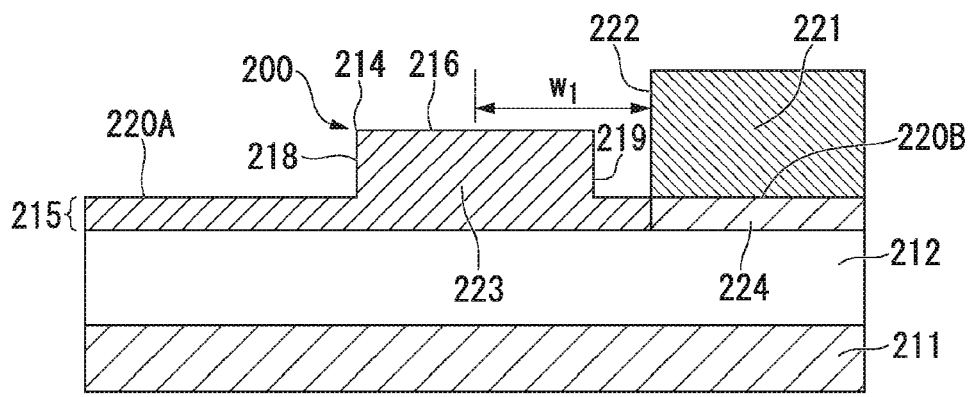
FIG. 9 is a cross-sectional view describing the formation of a P region.

An optical resist is applied onto the rib waveguide 200, and an optical resist 221 having a cross-sectional shape illustrated in FIG. 9 is obtained through photolithography. A top surface 216 and side walls 218 and 219 on both sides of a rib 214 in the center of the rib waveguide 200, the entire area of a top surface 220A of a slab 215 on the left side of the rib 214 in the width direction (left side of the rib 214), and an area in a top surface 220B located on the side opposite to the top surface 220A in the width direction are exposed by removing the optical resist, with the area of the top surface 220A being contiguous to the rib 214. The entire top surface 220A and the part of the top surface 220B of the slab 215 are exposed parts on which the rib 214 is not present.

The horizontal distance $w_1$ from the center of $w_{rib}$, that is, the center of the rib 214 in the width direction on the horizontal surface to a side wall 222 of the optical resist 221 is 700 nm. Boron that is P-type dopant is implanted into regions in which the surface of the rib waveguide 200 is exposed, that is, the exposed parts through the ion implantation, and a P region 223 is formed. A part immediately below the optical resist 221 forms an undoped region 224.

Figure 10:
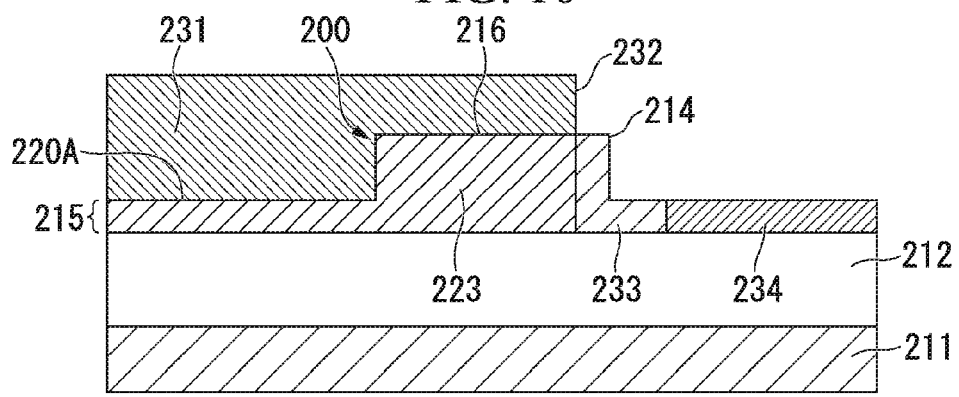
FIG. 10 is a cross-sectional view describing the formation of a P+ region and a P− region.
Figure 26:
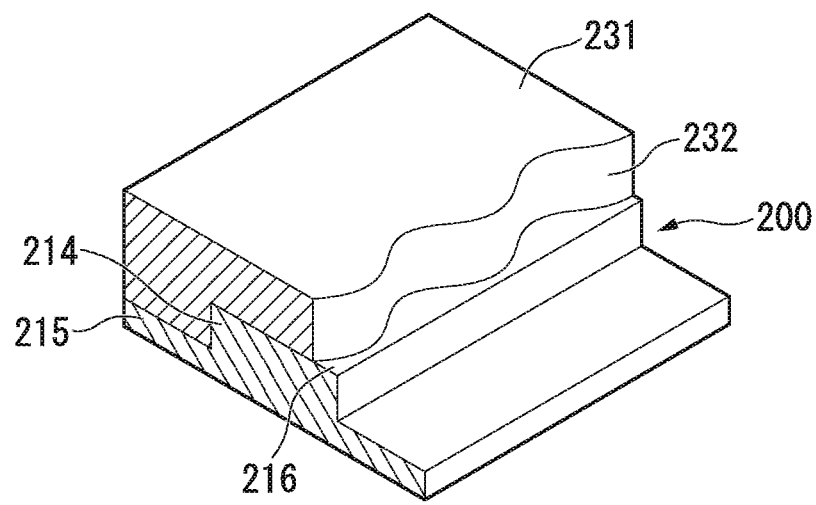
FIG. 26 is a schematic perspective view illustrating optical resist before trimming.

After removing the optical resist 221, an optical resist is applied, and an optical resist 231 having a cross-sectional shape of FIG. 10 is formed. A side wall 232 of the optical resist 231 has a corrugated shape as illustrated in FIG. 26. The optical resist 231 covers the entire area of the top surface 220A of the slab 215 which is located on the left side of the rib 214 and a part of the top surface 216 of the rib 214. Boron is ion-implanted into the inside from the regions in which the surface of the rib waveguide 200 is exposed, and a P+ region 233 is obtained. The ion implantation is carried out in two steps. In the P+ region 233, based on the surface of the slab section as a boundary, the carrier density in the region above the boundary is higher than the carrier density in the region below the boundary. Due to ion diffusion, the carrier density changes smoothly (graded) rather than abruptly in the boundary. Ion acceleration voltage is adjusted in individual steps to satisfy relation ship of the carrier density described below. The undoped region 224 in FIG. 9 is converted to a P− region 234 in FIG. 10. The electric characteristics of the P region 223 immediately below the optical resist 231 do not change.

Figure 11:
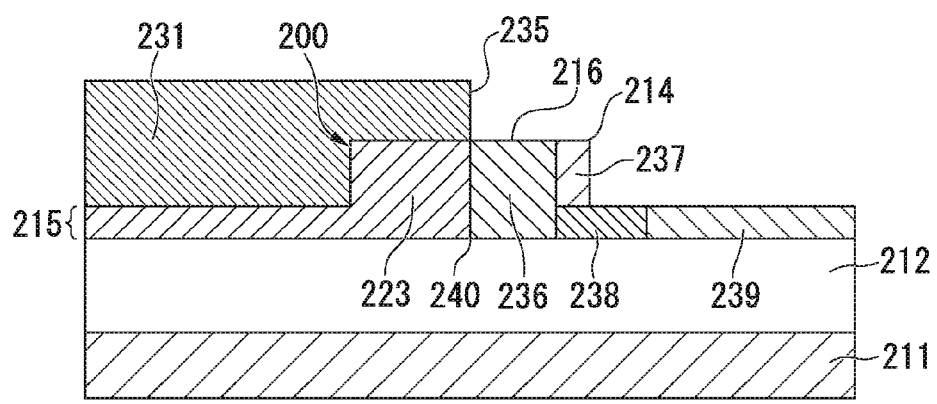
FIG. 11 is a cross-sectional view describing the formation of an N region, a low conductive region (an intrinsic region), an N− region, an N+ region and a P region.
Figure 27:
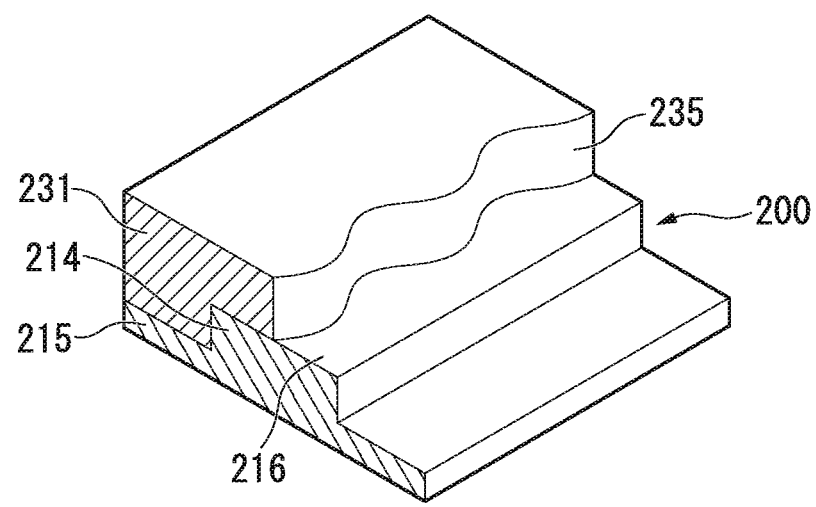
FIG. 27 is a schematic perspective view illustrating optical resist after trimming.

A cross-sectional shape illustrated in FIG. 11 is obtained by carrying out trimming (refer to FIG. 27) without removing the optical resist 231. The position of a side wall 235 of the optical resist 231 is moved back on the top surface 216 of the rib 214, and a wider range of the top surface 216 in the width direction is exposed compared with the range before trimming. In FIGS. 26 and 27, the doped regions are not distinguished and similar hatching is carried out on the cross-section of the rib waveguide 200. The shape of the side wall 232 before trimming in FIGS. 10 and 26 corresponds to a corrugated boundary between an N region 236 and an intrinsic region 237 in FIGS. 11 to 13. The shape of the side wall 235 after trimming in FIGS. 11 and 27 corresponds to a corrugated boundary of a PN junction in FIGS. 12 and 13. Since the two corrugated boundaries can be formed using one optical resist 231, it is possible to suppress the position deviation of the corrugated patterns compared with a case of corrugated pattern formation with removal of the optical resist 231 and subsequent patterning of a new optical resist. Examples of a trimming process include a process step in which an optical resist is partially oxidized and removed using $O_2$ plasma etching or the like. The moved-back distance (displacement) of the resist side wall can be adjusted depending on the intensity, time and the like of the $O_2$-plasma treatment. In a case in which the thickness of the optical resist decreases during trimming, it is necessary to procure a sufficiently thick optical resist in advance.

Phosphorous that is N-type dopant is ion-implanted into the regions in which the surface of the rib waveguide 200 is exposed, and a section in which the surface of the P region 223 is exposed is converted to the N region 236. The P+ region 233 in FIG. 10 is converted to the intrinsic region 237 and an N− region 238. The P− region 234 in FIG. 10 is converted to an N+ region 239. The intrinsic region 237 is contiguous to a side wall on the right side of the rib 214. The N− region 238 is formed in the slab section immediately below the intrinsic region 237. The N region 236, the intrinsic region 237 and the N− region 238 are contiguous to each other at their boundaries. The N− region 238 and the N+ region 239 are contiguous to each other through at their boundary. The electric characteristics of the P region 223 immediately below the optical resist 231 do not change. A PN junction is formed along a boundary 240 between the P region 223 and the N region 236. The cross-sectional view of FIG. 11 illustrates a PN junction under zero bias voltage. The width of the depletion region is negligible and is thus not shown.

Figure 12:
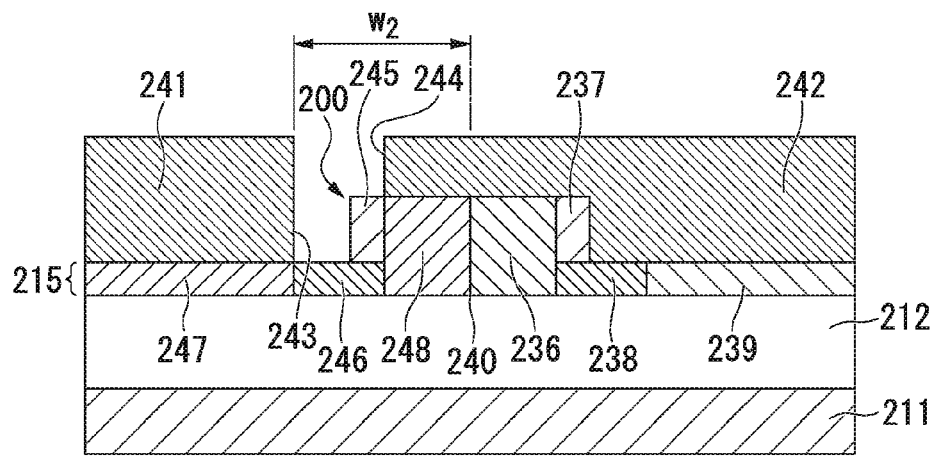
FIG. 12 is a cross-sectional view describing the formation of an intrinsic region, a P− region, a P region and a P region.

After removing the optical resist 231, optical resists 241 and 242 having cross-sectional shapes illustrated in FIG. 12 are obtained through application of an optical resist and subsequent photolithography process. The horizontal distance $w_2$ from the center of the rib 214 in the width direction on the horizontal surface to a side wall 243 of the optical resist 231 is 700 nm. A side wall 244 of the optical resist 242 has a corrugated shape. Phosphorous that is N-type dopant is ion-implanted into the inside from the regions in which the surface of the rib waveguide 200 is exposed in two steps, and a region immediately below the section in which the surface of the P region 223 is exposed is converted to an intrinsic region 245 and a P− region 246. The intrinsic region 245 is contiguous to a side wall on the left side of the rib 214. The P-region 246 is formed in the slab 215 immediately below the intrinsic region 245. The electric characteristics of individual sections of the P region 223 immediately below the optical resists 241 and 242 do not change; however, for the sake of discrimination, a section immediately below the optical resist 241 is represented as a P region 247, and a section immediately below the optical resist 242 is represented as a P region 248. The P region 248, the intrinsic region 245 and the P− region 246 are contiguous to each other at their boundaries. The P− region 246 and the P region 247 are contiguous to each other at their boundary.

After removing the optical resists 241 and 242, to reduce contact resistance in electric connection, the P++ region 251 is formed in a part of the P region 247 through ion implantation as illustrated in FIG. 13. Furthermore, the N++ region 252 is formed in a part of the N+ region 239 through ion implantation. The electric characteristics of the remaining sections of the P region 247 and the N+ region 239 do not change. The order of the formation process steps of the P++ region 251 and the N++ region 252 may be reversed.

When the carrier densities in the intrinsic region 245, the P− region 246, the P region 248 and the P++ region 251 are denoted by $p_{IP}$, $p_{P-}$, $p_P$ and $p_{P++}$ respectively, and the carrier densities in the intrinsic region 237 the N− region 238, the N region 236, the N+ region 239 and the N++ region 252 by $n_{IN}$, $n_{N-}$, $n_N$, $n_{N+}$ and $n_{N++}$ respectively, the following relation formulae are satisfied.

$$p_{IP} < p_{P-} < p_P < p_{P++} \qquad (2)$$

$$n_{IN} < n_{N-} < n_N < n_{N+} < n_{N++} \qquad (3)$$

For example, $p_{IP}$ and $n_{IN}$ are smaller than $1\times10^{17}$ cm$^{-3}$, and are preferably $1\times10^{16}$ cm$^{-3}$ or less. $p_P$ and $n_N$ are, for example, in a range of $1\times10^{18}$ cm$^{-3}$ to $5\times10^{18}$ cm$^{-3}$, and $p_{P++}$ and $n_{N++}$ are $1\times10^{19}$ cm$^{-3}$ or more. The carrier density in the P region 247 is equal to $p_P$. In the following examples, the same relation formulae are satisfied. However, the values of the carrier density are not necessarily limited to the exemplified value ranges, and may be set to be appropriate to suit low driving voltage, low optical loss, and high-speed operation.

An upper cladding 213 having a thickness of 2 μm in the vertical direction is formed by depositing SiO$_2$ on the rib waveguide 200. Through-hole vias are formed in the upper cladding 213, and via electrodes 253 and 254 for vertical interconnect access are formed. Traveling-wave electrodes 255 and 256 are formed on the upper cladding 213. The traveling-wave electrodes 255 and 256 are a part of a traveling-wave electrode propagating high-frequency electric signals such as a coplanar waveguide or a coplanar stripline. The via electrodes 253 and 254 and the traveling-wave electrodes 255 and 256 are formed of aluminum. When a high-frequency electric signal is applied to the traveling-wave electrode 255 or 256, the width of the depletion layer along the PN junction in the boundary 240 under reverse bias or an electric current flowing along the PN junction in the boundary 240 under bias is modulated, and the refractive index of the rib waveguide is modulated at a high speed.

Example 2

Figure 14:
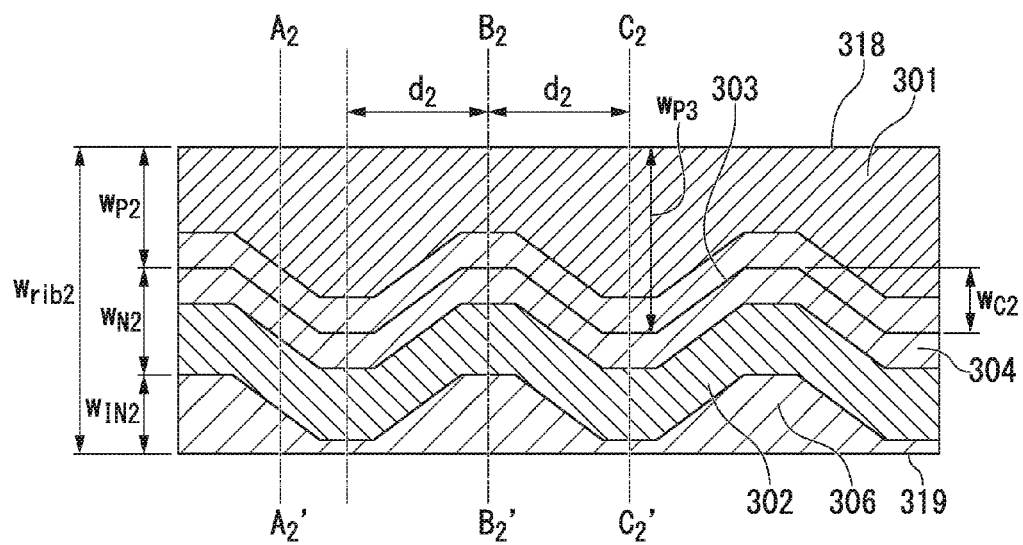
FIG. 14 is a top view illustrating an example of a rib on a rib waveguide of a second example.
Figure 15:
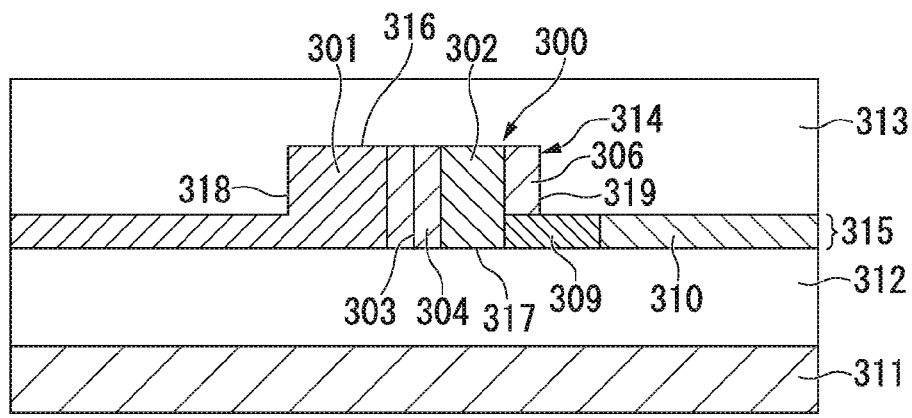
FIG. 15 is a schematic cross-sectional view of an optical waveguide device including the rib waveguide in a vertical surface including an alternate long and short dash line $A_2A_2'$ in FIG. 14.

In the present example, a second configuration of the optical waveguide device of the invention will be described. FIG. 14 schematically illustrates a top view illustrating a rib in the example. A cross-sectional view of an optical waveguide device including the rib waveguide is schematically illustrated in FIG. 15. Since the constituents of a substrate 311, a lower cladding 312, an upper cladding 313, a rib 314 and a slab 315 in a rib waveguide 300 are same as those of the substrate 111, the lower cladding 112, the upper cladding 113, the rib 114 and the slab 115 in the rib waveguide 100 in Example 1 respectively, they will not be described again here.

A P-doped P region 301 and an N-doped N region 302 are distributed in corrugated shapes in the propagating direction of the guided light. The width $w_{N2}$ of the N region 302 is substantially constant in the propagating direction of guided light, and $w_{N2}=w_N$ (refer to FIG. 1). For example, when $w_{rib2}$ is 500 nm, $w_{N2}$ is 90 nm. On the other hand, the width of the P region 301 changes in the propagating direction of guided light in a range of $w_{P2}$ to $w_{P3}$.

Along a boundary 303 between the P region 301 and the N region 302, a PN junction is formed. In the example as well, reverse bias voltage is applied to the optical waveguide device, and a depletion region 304 extends from the boundary 303 toward the P region 301 and the N region 302 of the PN junction. The period of the corrugation patterns is $2d_2$. The P region 301 and the N region 302 are disposed across a region of the rib 314 and the slab 315 immediately below the rib 314 in the rib waveguide 300. In the vertical direction, the P region 301 and the N region 302 are disposed from a top surface 316 of the rib 314 to a bottom surface 317 of the slab 315. In the horizontal direction, the P region 301 and the N region 302 extend in the propagating direction of the guided light within a limited range in accordance with purposes such as refractive index modulation. Similarly to Example 1, the boundary 303 is formed from the top surface 316 of the rib 314 to the bottom surface 317 of the slab 315 in the vertical direction, and extends in a corrugated line in the propagating direction of the guided light in the horizontal direction.

The width $w_{rib2}$ of the rib 314 is equal to that in Example 1 (refer to FIG. 1), and $w_{rib2}=w_{rib}$. The range within which the position of the boundary 303 changes in a direction along $w_{rib2}$ is denoted by the width $w_{c2}$. $w_{c2}$ is equal to the value of $w_c$ in Example 1. For example, when $w_{rib2}$ is 500 nm, $w_{c2}$ is 130 nm. When the minimum value and maximum value of the width of the P region 301 are denoted by $w_{P2}$ and $w_{P3}$, $w_{P2}=200$ nm and $w_{P3}=330$ nm. In this case, $w_{P2}$ is equal to the sum of $w_{p2}$ and $w_{cp}$.

In the rib waveguide of the example as well, the refractive index is periodically distributed in the propagating direction of the guided light so that Bragg reflection is caused and Bragg grating having a negative refractive index contrast is formed. In the example, an intrinsic region is provided only on one side of the rib in the width direction, and, since the effective refractive index in the vertical surface including the alternate long and short dash line $B_2B_2'$ and the effective refractive index in the vertical surface including the alternate long and short dash line $C_2C_2'$ are different each other, the period $d_G$ of the Bragg grating is equal to the period $2d_2$ in the physical structure. That is, $d_G=2d_2$. Therefore, when $2d_2 \geq 313$ nm, it is possible to obtain a return loss of 30 dB or more in the C and L bands.

A part of constituents of the optical waveguide device including the rib waveguide in a vertical surface including an alternate long and short dash line $A_2A_2'$ is illustrated in a schematic cross-sectional view of FIG. 15. The alternate long and short dash line $A_2A_2'$ passes through one of those points at which the boundary 303 is located in the center of $w_{rib2}$ on the straight axis along the propagating direction of the guided light, and is drawn in parallel to $w_{rib2}$. The lower cladding 312, the rib waveguide 300 and the upper cladding 313 are disposed on the substrate 311. In the rib waveguide 300, the P region 301, the N region 302, the boundary 303 between the P region 301 and the N region 302, the depletion region 304 along the PN junction on the boundary 303, an intrinsic region 306 contiguous to a side wall 319 of the rib 314 in the rib waveguide 300, an N− region 309 disposed in the slab 315 immediately below the intrinsic region 306, and an N+ region 310 outside the N− region are formed. The P region 301 extends up to a part of the slab 315 in which the rib 314 is not present on the slab 315.

Figure 16:
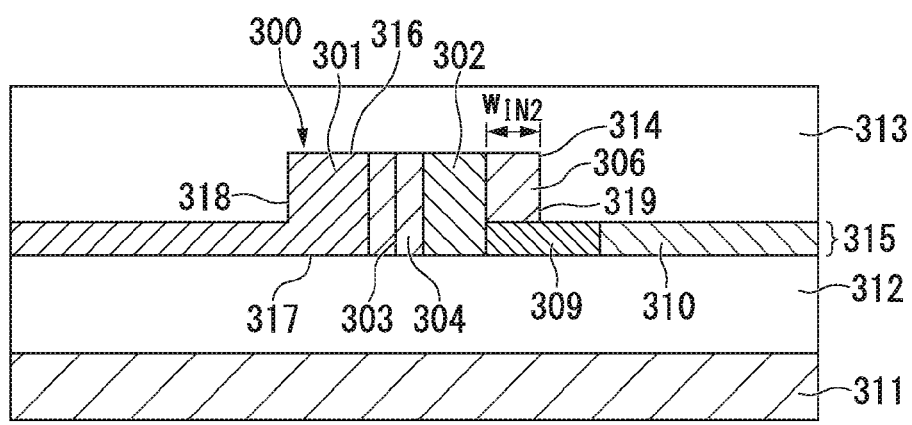
FIG. 16 is a schematic cross-sectional view of the optical waveguide device including the rib waveguide in a vertical surface including an alternate long and short dash line $B_2B_2'$ in FIG. 14.

A schematic cross-sectional view of the optical waveguide device including the rib waveguide in a vertical surface including an alternate long and short dash line $B_2B_2'$ is illustrated in FIG. 16. The alternate long and short dash line $B_2B_2'$ passes through a point at which the N region 302 is farthest from the side wall 319 of the rib 314 on the opposite side of the boundary 303 within a range of the period $2d_2$ on the straight axis along the propagating direction of the guided light, and is drawn in parallel to $w_{rib2}$. At this point, the width of the intrinsic region 306 becomes largest in the direction along the alternate long and short dash line $B_2B_2'$. The width is denoted by $w_{IN2}$. $w_{IN2}=w_{IN}$ (refer to FIG. 1). For example, when $w_{rib2}$ is 500 nm, $w_{IN2}$ is 210 nm.

Figure 17:
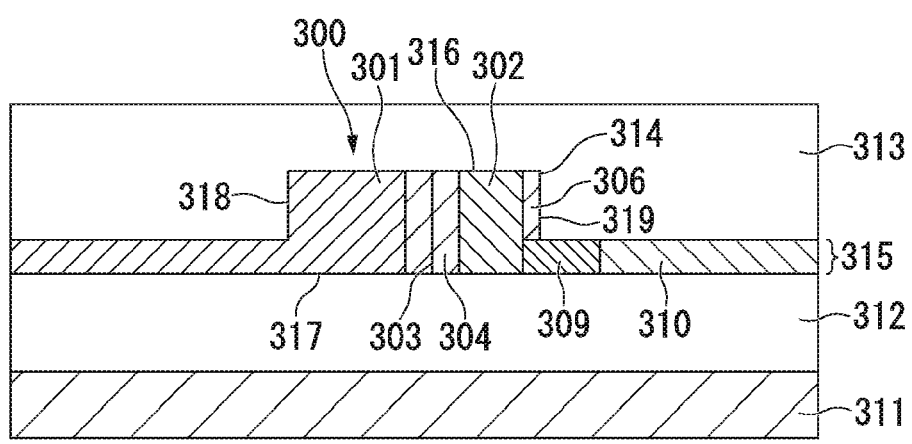
FIG. 17 is a schematic cross-sectional view of the optical waveguide device including the rib waveguide in a vertical surface including an alternate long and short dash line $C_2C_2'$ in FIG. 14.

A schematic cross-sectional view of the optical waveguide device including the rib waveguide in a vertical surface including an alternate long and short dash line $C_2C_2'$ is illustrated in FIG. 17. The alternate long and short dash line C2C2' passes through a point at which the P region 101 is closest to the side wall 319 of the rib 314 on the opposite side of the boundary 303 within a range of the period 2d on the straight axis along the propagating direction of the guided light, and is drawn in parallel to $w_{rib2}$.

Figure 18:
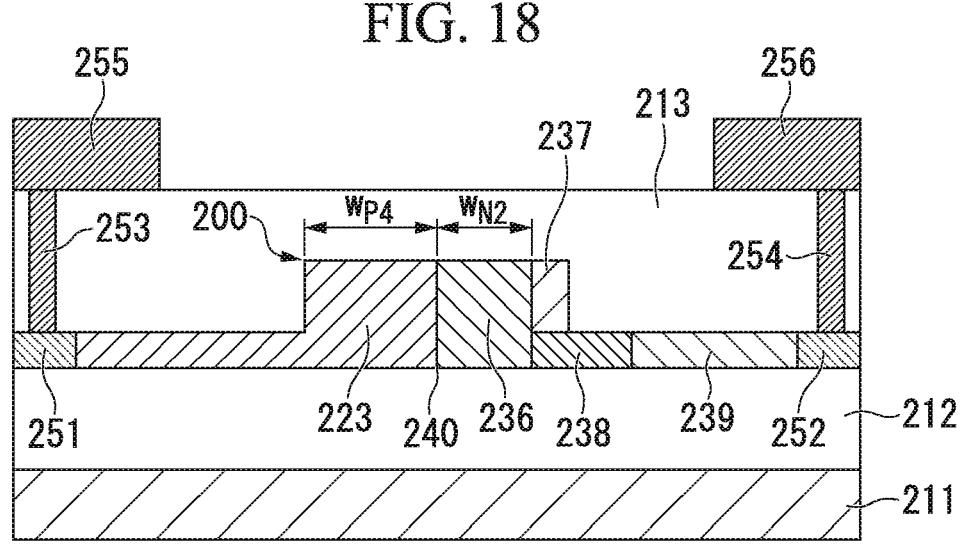
FIG. 18 is a schematic cross-sectional view of an optical waveguide device (including electrodes and the like) of Example 2.

A schematic cross-sectional view of the optical waveguide device of the example is illustrated in FIG. 18. In the fabrication of the present device, the same fabrication processes as in Example 1 are adopted up to the fabrication step of the N region 236, the intrinsic region 237, the N− region 238, the N+ region 239 and the P region 223 in FIG. 11. After that, the P++ region 251 and the N++ region 252 are formed through ion implantation. The upper cladding 213 having a thickness of 2 μm in the vertical direction is formed by depositing $SiO_2$ on the rib waveguide 200. Through-hole vias are formed in the upper cladding 213, and via electrodes 253 and 254 are formed. The traveling-wave electrodes 255 and 256 are fabricated on the upper cladding 213. $w_{P4}$ is a mean value of $w_{P2}$=200 nm and $w_{P3}$=330 nm, and is 265 nm.

In the optical waveguide device of the example, there is no intrinsic region adjacent to a side wall of the rib closer to the P region 223 than to the N region 236 as illustrated in FIG. 18, and simpler fabrication is possible. Therefore, optical characteristic variation caused by fabrication errors becomes smaller than that of the device of Example 1, and thereby, it is possible to provide an optical waveguide device having smaller quality variation.

Example 3

Figure 19:
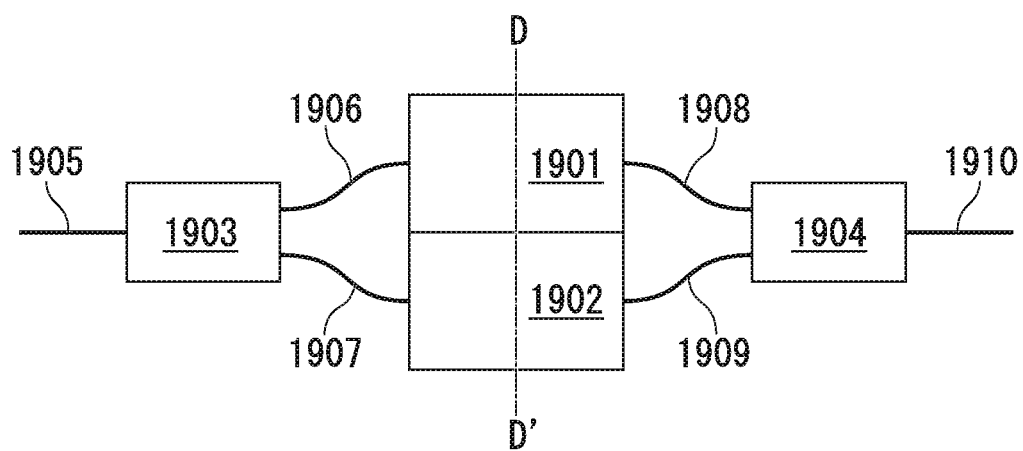
FIG. 19 is a block diagram of a configuration of an MZ optical modulator.

A configuration of an optical waveguide device functioning as a Mach-Zehnder (MZ) optical modulator will be described using the optical waveguide device described in Example 1 or 2. A block diagram of the configuration of the MZ optical modulator is illustrated in FIG. 19. The MZ optical modulator consists of the following components:
input waveguide 1905;
1×2 splitter section 1903;
first arm consisting of a waveguide 1906, a phase shifter 1901 and a waveguide 1908; second arm consisting of a waveguide 1907, a phase shifter 1902 and a waveguide 1909;
2×1 coupler section 1904; and
output waveguide 1910.

An input port of the 1×2 splitter section 1903 is connected to the input waveguide 1905, and two output ports of the 1×2 splitter section 1903 are respectively connected to the two arms. Two input ports of the 2×1 coupler section 1904 are respectively connected to the two arms, and an output port of the 2×1 coupler section 1904 are connected to the output waveguide 1910.

The input waveguide 1905, the waveguides 1906, 1907, 1908 and 1909, and the output waveguide 1910 have a rectangular silicon core. The width of the rectangular core is equal to the width of the rib in the rib waveguide described in Example 1 or 2. The height of the square core is equal to the height ($h_{rib}$ in FIG. 8) of the rib waveguide. In a connection section between the rectangular core and the rib waveguide, an upper section of the square core is connected to the rib in the rib waveguide, and a lower section of the square core is connected to the slab in the rib waveguide.

The MZ optical modulator in FIG. 19 is fabricated through monolithic integration on an SOI wafer. Each of the phase shifters 1901 and 1902 has a single rib waveguide (core), and is formed adjacent to each other on an SOI substrate. The MZ optical modulator in FIG. 19 is an optical waveguide device including a plurality of rib waveguides (cores).

Figure 20:
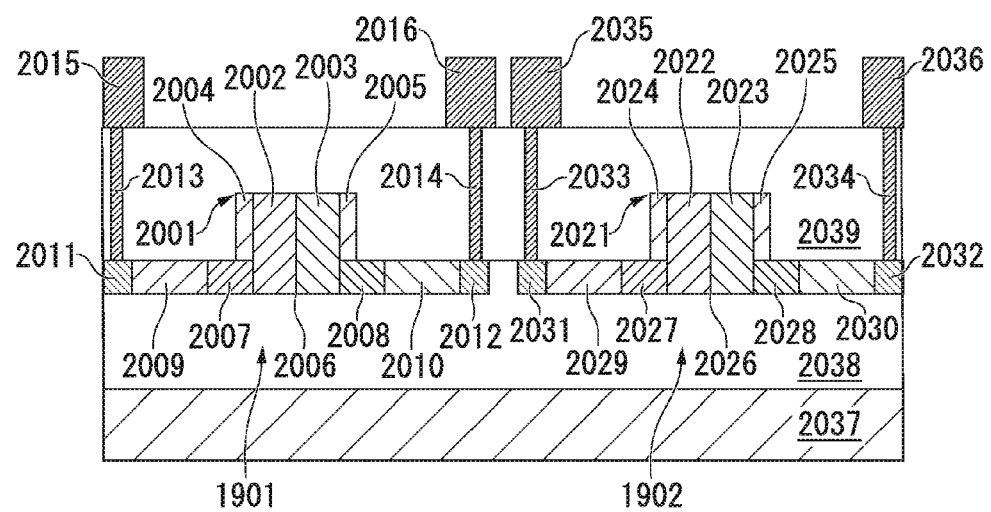
FIG. 20 is a schematic cross-sectional view of phase shifters of Example 3 in which the optical waveguide device of Example 1 is used.

FIG. 20 illustrates a schematic cross-sectional view of the phase shifters 1901 and 1902 configured using the optical waveguide device described in Example 1 on a vertical surface including an alternate long and short dash line DD'. The left half of the schematic cross-section corresponds to the phase shifter 1901 and the right half corresponds to the phase shifter 1902.

A lower cladding 2038 is disposed on a substrate 2037. A rib waveguide 2001 that serves as a core of a waveguide in the phase shifter 1901 and a rib waveguide 2021 that serves as a core of a waveguide in the phase shifter 1902 are disposed on the lower cladding 2038. An upper cladding 2039 is disposed on the rib waveguides 2001 and 2021. An SOI layer between the rib waveguide 2001 and the rib waveguide 2021 is removed, and silica is loaded. In a case in which electric conductance between the phase shifter 1901 and the phase shifter 1902 through the SOI layer is negligible, it is not necessary to remove the SOI layer. The description of the above-described removal of the SOI layer shall also apply to other Examples below.

The configuration of each of the phase shifter 1901 and the phase shifter 1902 in FIG. 20 is the same as in Example 1.

In the rib waveguide 2001, a P region 2002, an N region 2003, a boundary 2006, an intrinsic region 2004, an intrinsic region 2005, a P− region 2007, an N− region 2008, a P region 2009, an N+ region 2010, a P++ region 2011 and an N++ region 2012 are formed. A traveling-wave electrode 2015 and the P++ region 2011 are electrically connected to each other through a via electrode 2013, and a traveling-wave electrode 2016 and the N++ region 2012 are electrically connected to each other through a via electrode 2014.

In the rib waveguide 2021, a P region 2022, an N region 2023, a boundary 2026, an intrinsic region 2024, an intrinsic region 2025, a P− region 2027, an N− region 2028, a P region 2029, an N+ region 2030, a P++ region 2031 and an N++ region 2032 are formed. A traveling-wave electrode 2035 and the P++ region 2031 are electrically connected to each other through a via electrode 2033, and a traveling-wave electrode 2036 and the N++ region 2032 are electrically connected to each other through a via electrode 2034.

Figure 21:
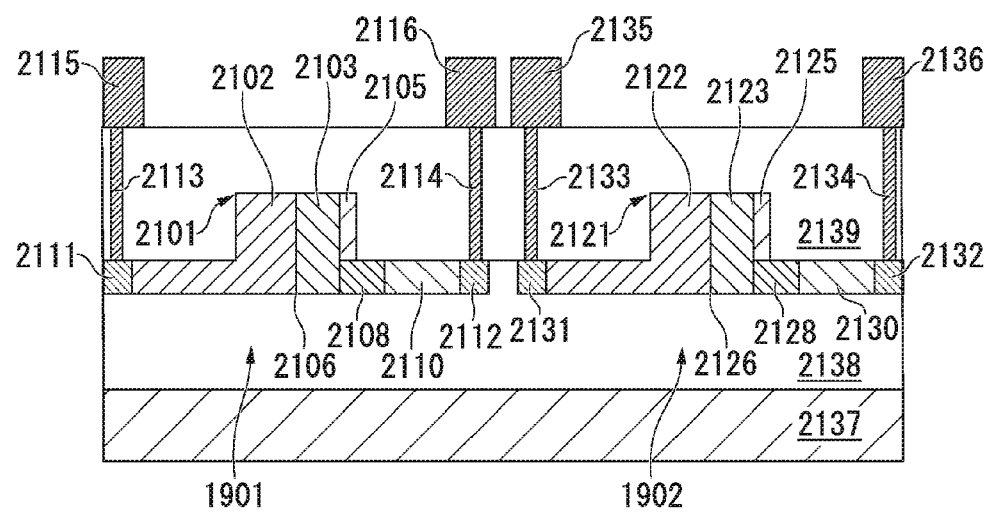
FIG. 21 is a schematic cross-sectional view of phase shifters of Example 3 in which the optical waveguide device of Example 2 is used.

FIG. 21 illustrates a schematic cross-sectional view of the phase shifters 1901 and 1902 configured using the optical waveguide device described in Example 2 on a vertical surface including an alternate long and short dash line DD'. A lower cladding 2138 is disposed on a substrate 2137. A rib waveguide 2101 that serves as the core of the waveguide in the phase shifter 1901 and a rib waveguide 2121 that serves as the core of the waveguide in the phase shifter 1902 are disposed on the lower cladding 2138. An upper cladding 2139 is disposed on the rib waveguides 2101 and 2121. The configuration of each of the phase shifter 1901 and the phase shifter 1902 is the same as in Example 2.

In the rib waveguide 2101, a P region 2102, an N region 2103, a boundary 2106, an intrinsic region 2105, an N− region 2108, an N+ region 2110, a P++ region 2111 and an N++ region 2112 are formed. A traveling-wave electrode 2115 and the P++ region 2111 are electrically connected to each other through a via electrode 2113, and a traveling-wave electrode 2116 and the N++ region 2112 are electrically connected to each other through a via electrode 2114.

In the rib waveguide 2121, a P region 2122, an N region 2123, a boundary 2126, an intrinsic region 2125, an N− region 2128, an N+ region 2130, a P++ region 2131 and an N++ region 2132 are formed. A traveling-wave electrode 2135 and the P++ region 2131 are electrically connected to each other through a via electrode 2133, and a traveling-wave electrode 2136 and the N++ region 2132 are electrically connected to each other through a via electrode 2134.

In the above-described two configurations of the Example, since the phase shifter 1901 and the phase shifter 1902 are independent from each other, electric crosstalk is reduced between both phase shifters, and a high extinction ratio or a high Q value is easily obtained.

Example 4

Another configuration of an optical waveguide device functioning as the Mach-Zehnder (MZ) optical modulator illustrated in the block diagram of FIG. 19 will be described using the optical waveguide device described in Example 1 or 2.

Figure 22:
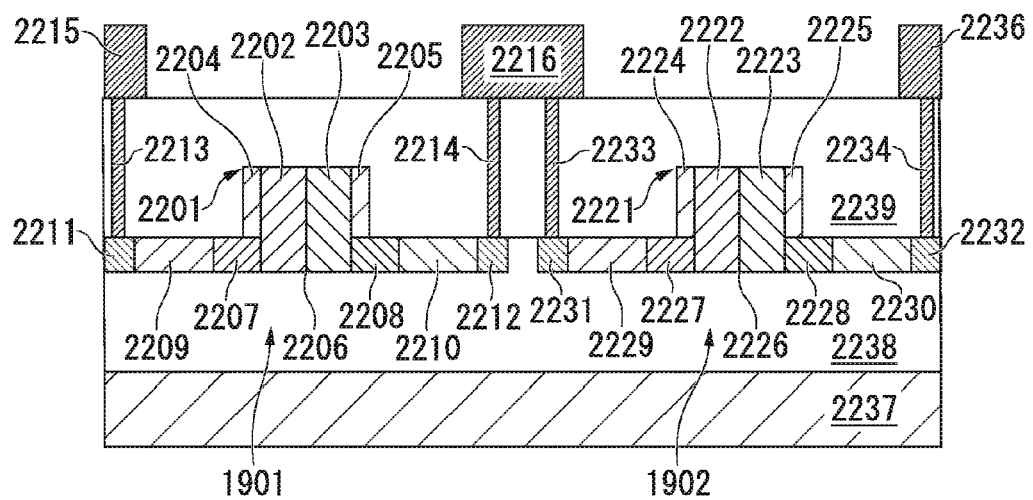
FIG. 22 is a schematic cross-sectional view of phase shifters of Example 4 in which the optical waveguide device of Example 1 is used.

FIG. 22 illustrates a schematic cross-sectional view of the phase shifters 1901 and 1902 configured using the optical waveguide device described in Example 1 on a vertical surface including an alternate long and short dash line DD'. A lower cladding 2238 is disposed on a substrate 2237. A rib waveguide 2201 that serves as the core of the waveguide in the phase shifter 1901 and a rib waveguide 2221 that serves as the core of the waveguide in the phase shifter 1902 are disposed on the lower cladding 2238. An upper cladding 2239 is disposed on the rib waveguides 2201 and 2221.

In the rib waveguide 2201, a P region 2202, an N region 2203, a boundary 2206, an intrinsic region 2204, an intrinsic region 2205, a P− region 2207, an N− region 2208, a P region 2209, an N+ region 2210, a P++ region 2211 and an N++ region 2212 are formed. A traveling-wave electrode 2215 and the P++ region 2211 are electrically connected to each other through a via electrode 2213, and a traveling-wave electrode 2216 and the N++ region 2212 are electrically connected to each other through a via electrode 2214.

In the rib waveguide 2221, a P region 2222, an N region 2223, a boundary 2226, an intrinsic region 2224, an intrinsic region 2225, a P− region 2227, an N− region 2228, a P region 2229, an N+ region 2230, a P++ region 2231 and an N++ region 2232 are formed. A traveling-wave electrode 2216 and the P++ region 2231 are electrically connected to each other through a via electrode 2233, and a traveling-wave electrode 2236 and the N++ region 2232 are electrically connected to each other through a via electrode 2234.

Figure 23:
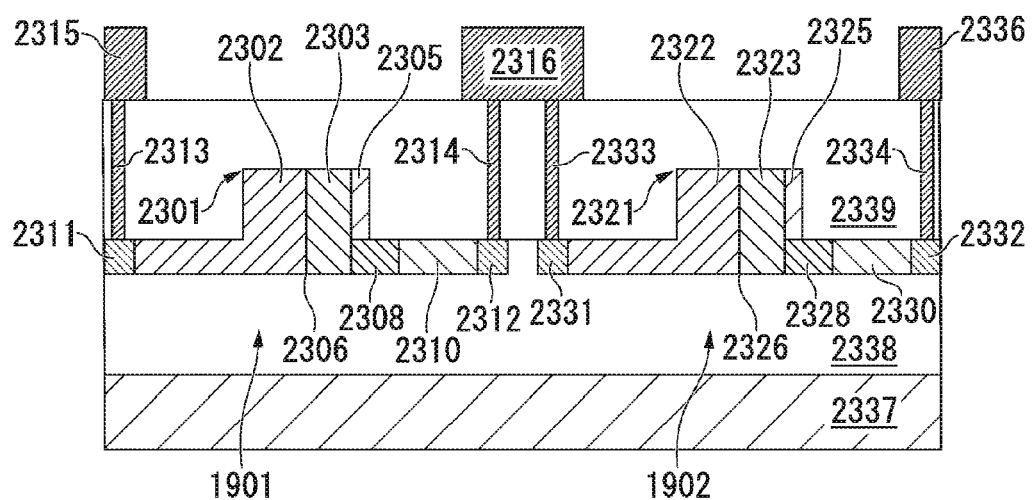
FIG. 23 is a schematic cross-sectional view of phase shifters of Example 4 in which the optical waveguide device of Example 2 is used.

FIG. 23 illustrates a schematic cross-sectional view of the phase shifters 1901 and 1902 configured using the optical waveguide device described in Example 2 on a vertical surface including an alternate long and short dash line DD'. A lower cladding 2338 is disposed on a substrate 2337. A rib waveguide 2301 that serves as the core of the waveguide in the phase shifter 1901 and a rib waveguide 2321 that serves as the core of the waveguide in the phase shifter 1902 are disposed on the lower cladding 2338. An upper cladding 2339 is disposed on the rib waveguides 2301 and 2321.

In the rib waveguide 2301, a P region 2302, an N region 2303, a boundary 2306, an intrinsic region 2305, an N− region 2308, an N+ region 2310, a P++ region 2311 and an N++ region 2312 are formed. A traveling-wave electrode 2315 and the P++ region 2311 are electrically connected to each other through a via electrode 2313, and a traveling-wave electrode 2316 and the N++ region 2312 are electrically connected to each other through a via electrode 2314.

In the rib waveguide 2321, a P region 2322, an N region 2323, a boundary 2326, an intrinsic region 2325, an N− region 2328, an N+ region 2330, a P++ region 2331 and an N++ region 2332 are formed. A traveling-wave electrode 2316 and the P++ region 2331 are electrically connected to each other through a via electrode 2333, and a traveling-wave electrode 2336 and the N++ region 2332 are electrically connected to each other through a via electrode 2334.

In the above-described two configurations of the Example, since the N++ region 2212 or 2312 in the phase shifter 1901 and the P++ region 2231 or 2331 in the phase shifter 1902 are electrically connected to each other through the traveling-wave electrode 2216 or 2316 respectively, and a simple configuration of the traveling-wave electrodes is obtained, it is possible to provide a small-footprint MZ optical modulator. In addition, it is possible to drive the MZ optical modulator in a push-pull scheme by applying a high-frequency electric signal to the traveling-wave electrode 2216 or 2316. Therefore, zero-chirp modulation using a single high-frequency signal source becomes possible, and it is possible to simplify a high-frequency electric driving circuit.

Example 5

The other configuration of an optical waveguide device functioning as the Mach-Zehnder (MZ) optical modulator illustrated in the block diagram of FIG. 19 will be described using the optical waveguide device described in Example 1 or 2.

Figure 24:
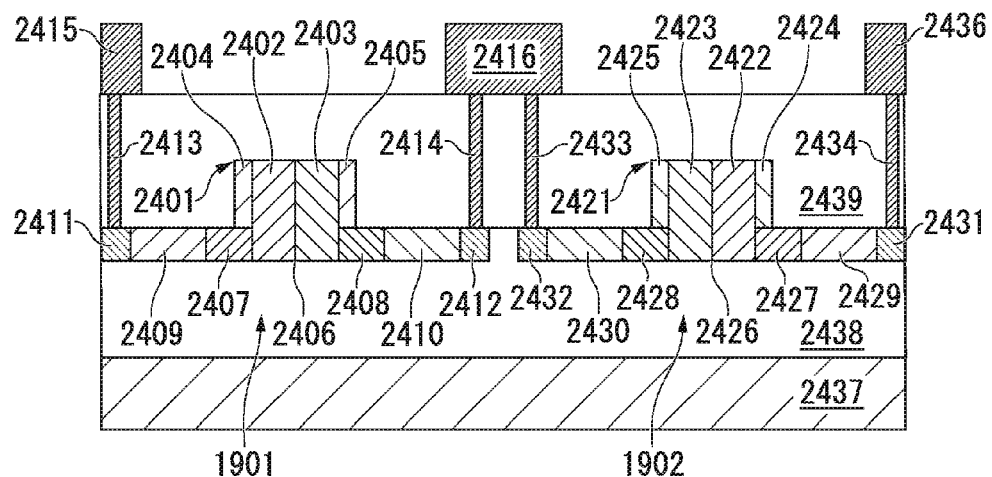
FIG. 24 is a schematic cross-sectional view of phase shifters of Example 5 in which the optical waveguide device of Example 1 is used.

FIG. 24 illustrates a schematic cross-sectional view of the phase shifters 1901 and 1902 configured using the optical waveguide device described in Example 1 on a vertical surface including an alternate long and short dash line DD'. A lower cladding 2438 is disposed on a substrate 2437. A rib waveguide 2401 that serves as the core of the waveguide in the phase shifter 1901 and a rib waveguide 2421 that serves as the core of the waveguide in the phase shifter 1902 are disposed on the lower cladding 2438. An upper cladding 2439 is disposed on the rib waveguides 2401 and 2421.

In the rib waveguide 2401, a P region 2402, an N region 2403, a boundary 2406, an intrinsic region 2404, an intrinsic region 2405, a P− region 2407, an N− region 2408, a P region 2409, an N+ region 2410, a P++ region 2411 and an N++ region 2412 are formed. A traveling-wave electrode 2415 and the P++ region 2411 are electrically connected to each other through a via electrode 2413, and a traveling-wave electrode 2416 and the N++ region 2412 are electrically connected to each other through a via electrode 2414.

In the rib waveguide 2421, a P region 2422, an N region 2423, a boundary 2426, an intrinsic region 2424, an intrinsic region 2425, a P− region 2427, an N− region 2428, a P region 2429, an N+ region 2430, a P++ region 2431 and an N++ region 2432 are formed. A traveling-wave electrode 2416 and the N++ region 2432 are electrically connected to each other through a via electrode 2433, and a traveling-wave electrode 2436 and the P++ region 2431 are electrically connected to each other through a via electrode 2434.

In the phase shifter 1902, the disposition of the respective dopant-distributed regions is reversed around a vertical axis along the boundary 2426 with respect to the phase shifter 1901.

Figure 25:
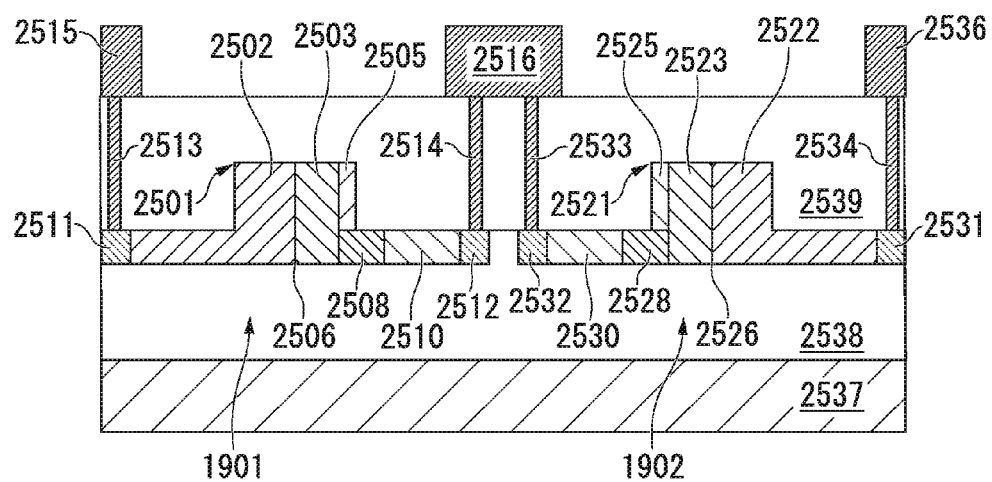
FIG. 25 is a schematic cross-sectional view of phase shifters of Example 5 in which the optical waveguide device of Example 2 is used.

FIG. 25 illustrates a schematic cross-sectional view of the phase shifters 1901 and 1902 configured using the optical waveguide device described in Example 2 on a vertical surface including an alternate long and short dash line DD'. A lower cladding 2538 is disposed on a substrate 2537. A rib waveguide 2501 that serves as the core of the waveguide in the phase shifter 1901 and a rib waveguide 2521 that serves as the core of the waveguide in the phase shifter 1902 are disposed on the lower cladding 2538. An upper cladding 2539 is disposed on the rib waveguides 2501 and 2521.

In the rib waveguide 2501, a P region 2502, an N region 2503, a boundary 2506, an intrinsic region 2505, an N− region 2508, an N+ region 2510, a P++ region 2511 and an N++ region 2512 are formed. A traveling-wave electrode 2515 and the P++ region 2511 are electrically connected to each other through a via electrode 2513, and a traveling-wave electrode 2516 and the N++ region 2512 are electrically connected to each other through a via electrode 2514.

In the rib waveguide 2521, a P region 2522, an N region 2523, a boundary 2526, an intrinsic region 2525, an N− region 2528, an N+ region 2530, a P++ region 2531 and an N++ region 2532 are formed. A traveling-wave electrode 2516 and the N++ region 2532 are electrically connected to each other through a via electrode 2533, and a traveling-wave electrode 2536 and the P++ region 2531 are electrically connected to each other through a via electrode 2534.

In the phase shifter 1902, the disposition of the respective dopant-distributed regions is reversed around a vertical axis along the boundary 2526 with respect to the phase shifter 1901.

In the above-described two configurations of the Example, since the N++ region 2412 or 2512 in the phase shifter 1901 and the N++ region 2432 or 2532 in the phase shifter 1902 are electrically connected to each other through the traveling-wave electrode 2416 or 2516 respectively, and a simple configuration of the traveling-wave electrodes is obtained, it is possible to provide a small-footprint MZ optical modulator. In addition, since the two doped regions (the N++ region 2412 or 2512 and the N++ region 2432 or 2532) connected through the traveling-wave electrode have the same electric conductivity, it is possible to suppress the drift of the DC potential of the traveling-wave electrode 2416 or 2516, and to provide a stably operating MZ optical modulator.

Thus far, the invention has been described based on the preferred embodiments, but the invention is not limited to the above-described embodiments, and a variety of modifications are permitted within the scope of the purpose of the invention.

Examples 1 and 2 describe examples in which the low conductive region is arranged between the dope region contiguous to the PN junction and the side wall of the rib, but the low conductive region having lower electric conductivity than the P region may be arranged so as to be contiguous to the side wall of the rib which is closer to the P region than N region. Also, the low conductive region having lower electric conductivity than the N region may be arranged so as to be contiguous to the side wall of the rib which is closer to the N region than P region.

Examples 1 and 2 describe examples in which a doped region having a lower carrier density than that of the doped region contiguous to the PN junction is disposed immediately below the low conductive region (especially, the intrinsic region), but it is also possible to extend the doped region contiguous to the PN junction (a doped region having substantially the same carrier density as the above-described doped region) up to immediately below the low conductive region (especially, the intrinsic region), and furthermore, to extend the doped region contiguous to the PN junction up to a part of the slab in which the rib is not present on the slab.

Example 2 describes an example in which a low conductive region (especially, an intrinsic region) is disposed between the PN junction and the side wall of the rib on the side having a P-type electric conductivity; however, conversely, it is also possible to dispose a low conductive region (especially, an intrinsic region) between the PN junction and the side wall of the rib on the side having an N-type electric conductivity.

In the above-described description, a MZ optical modulator having two parallel rib waveguides (Example 1) provided with low conductive regions (especially, intrinsic regions) on both sides of the rib in the width direction and a MZ optical modulator having two parallel rib waveguides (Example 2) provided with a low conductive region (especially, an intrinsic region) only on one side of the rib in the width direction have been described as the MZ optical modulators of Examples 3 to 5. However, it is also possible to dispose in parallel a rib waveguide (Example 1) provided with low conductive regions (especially, intrinsic regions) on both sides of the rib in the width direction and a rib waveguide (Example 2) provided with a low conductive region (especially, an intrinsic region) only on one side of the rib in the width direction in a single MZ optical modulator.

The invention can be used as an optical waveguide device that enables high-speed refractive index modulation with low optical loss and low driving voltage.

What is claimed is:

1. An optical waveguide device comprising:
   a substrate;
   a lower cladding disposed on the substrate;
   a rib waveguide including a slab disposed on the lower cladding and a single rib disposed on the slab contiguous to the slab; and
   an upper cladding disposed on the rib waveguide,
   wherein the rib waveguide includes a first doped region having a first electric conductivity exhibiting a P-type electric conductivity across the rib and the slab and a second doped region being contiguous to the first doped region and having a second electric conductivity exhibiting an N-type electric conductivity across the rib and the slab,
   a boundary between the first doped region and the second doped region provides a PN junction formed in a direction perpendicular to a surface of the substrate and is disposed in a corrugated line in a propagating direction of guided light in the rib waveguide in a plan view of the substrate, and
   the rib waveguide includes at least one of a first low conductive region being contiguous to an opposite side of the second doped region in the rib and exhibiting lower electric conductivity than the second doped region and a second low conductive region being contiguous to an opposite side of the first doped region in the rib and exhibiting lower electric conductivity than the first doped region,
   wherein, in a case that the rib waveguide includes the first low conductive region, a third doped region being contiguous to the second doped region and the first low conductive region and having the second electric conductivity is disposed in a region immediately below the first low conductive region on the slab, a fourth doped region having the second electric conductivity is disposed contiguous to the third doped region in a part of the slab in which the rib is not present on the slab, a carrier density in the first low conductive region is lower than a carrier density in the third doped region, a carrier density in the third doped region is lower than a carrier density in the second doped region, and a carrier density in the fourth doped region is equal to or higher than the carrier density in the second doped region, and in a case that the rib waveguide includes the second low conductive region, a seventh doped region being contiguous to the first doped region and the first low conductive region and having the first electric conductivity is disposed in a region immediately below the second low conductive region of the slab, an eighth doped region having the first electric conductivity is disposed contiguous to the seventh doped region in a part of the slab in which the rib is not present on the slab, a carrier density in the first low conductive region is lower than a carrier density in the third doped region, a carrier density in the seventh doped region is lower than the carrier density in the first doped region, and a carrier density in the eighth doped region is equal to or higher than the carrier density in the first doped region.

2. The optical waveguide device according to claim 1, wherein at least one of the first low conductive region and the second low conductive region is an intrinsic region.

3. The optical waveguide device according to claim 1, wherein, in a case that the rib waveguide includes the first low conductive region, a width of the second doped region is substantially constant in a propagating direction of the guided light, and
in a case that the rib waveguide includes the second low conductive region, a width of the first doped region is substantially constant in the propagating direction of the guided light.

4. An optical waveguide device comprising:
a substrate:
a lower cladding disposed on the substrate;
a rib waveguide including a slab disposed on the lower cladding and a single rib disposed on the slab contiguous to the slab; and
an upper cladding disposed on the rib waveguide,
wherein the rib waveguide includes a first doped region having a first electric conductivity exhibiting a P-type electric conductivity across the rib and the slab and a second doped region being contiguous to the first doped region and having a second electric conductivity exhibiting an N-type electric conductivity across the rib and the slab,
a boundary between the first doped region and the second doped region provides a PN junction formed in a direction perpendicular to a surface of the substrate and is disposed in a corrugated line in a propagating direction of guided light in the rib waveguide in a plan view of the substrate,
the rib waveguide includes at least one of a first low conductive region being contiguous to an opposite side of the second doped region in the rib and exhibiting lower electric conductivity than the second doped region and a second low conductive region being contiguous to an opposite side of the first doped region in the rib and exhibiting lower electric conductivity than the first doped region,
wherein, in a case that the rib waveguide does not include the second low conductive region, the first doped region is extended up to a part of the slab in which the rib is not present on the slab in the same side with the first doped region with respect to the boundary, and
in a case that the rib waveguide does not include the first low conductive region, the second doped region is extended up to a part of the slab in which the rib is not present on the slab in the same side with the second doped region with respect to the boundary.

5. The optical waveguide device according to claim 1, further comprising:
a first metal electrode disposed on the upper cladding,
wherein a fifth doped region having the second electric conductivity is disposed in the part of the slab in which the rib is not present on the slab in the same side with the second doped region with respect to the boundary, and the fifth doped region and the first metal electrode are connected to each other through a first through-hole via.

6. The optical waveguide device according to claim 1, further comprising:
a second metal electrode disposed on the upper cladding,
wherein a sixth doped region having the first electric conductivity is disposed in the part of the slab in which the rib is not present on the slab in the same side with the first doped region with respect to the boundary, and the sixth doped region and the second metal electrode are connected to each other through a second through-hole via.

7. The optical waveguide device according to claim 1, wherein the rib waveguide has a first rib waveguide and a second rib waveguide, and
the first rib waveguide and the second rib waveguide are disposed parallel along a width direction of the optical waveguide device.

8. The optical waveguide device according to claim 7, wherein a part of the slab in the first rib waveguide closer to the second rib waveguide than the rib in the first rib waveguide is connected to a third metal electrode disposed on the upper cladding through a third through-hole via, and
a part of the slab in the second rib waveguide closer to the first rib waveguide than the rib in the second rib waveguide are connected to a fourth metal electrode disposed on the upper cladding through a fourth through-hole via.

9. The optical waveguide device according to claim 7, wherein a part of the slab in the first rib waveguide closer to the second rib waveguide than the rib in the first rib waveguide and a part of the slab in the second rib waveguide closer to the first rib waveguide than the rib in the second rib waveguide are connected electrically to a common fifth metal electrode disposed on the upper cladding through a third through-hole via and a fourth through-hole via respectively.

10. A method for manufacturing an optical waveguide device with:
a substrate;
a lower cladding disposed on the substrate;
a rib waveguide including a slab disposed on the lower cladding and a single rib disposed on the slab contiguous to the slab; and
an upper cladding disposed on the rib waveguide,
wherein the rib waveguide includes a first doped region having a first electric conductivity exhibiting a P-type electric conductivity across the rib and the slab and a second doped region being contiguous to the first doped region and having a second electric conductivity exhibiting an N-type electric conductivity across the rib and the slab,
a boundary between the first doped region and the second doped region provides a PN junction formed in a direction perpendicular to a surface of the substrate and is disposed in a corrugated line in a propagating direction of guided light in the rib waveguide in a plan view of the substrate, and
the rib waveguide includes at least one of a first low conductive region being contiguous to an opposite side of the second doped region in the rib and exhibiting lower electric conductivity than the second doped region and a second low conductive region being contiguous to an opposite side of the first doped region in the rib and exhibiting lower electric conductivity than the first doped region, said manufacturing method comprising:

a resist production step of, in a case that the rib waveguide includes the first low conductive region but does not include the second low conductive region, forming a first resist having a resist side wall disposed in a corrugated shape in the propagating direction of the guided light in the rib waveguide on a horizontal surface in a location serving as a boundary between the first low conductive region and the second doped region, covering a region serving as the second doped region, and exposing a region serving as the first low conductive region, in a case in which the rib waveguide includes the second low conductive region but does not include the first low conductive region, forming a second resist having a resist side wall disposed in a corrugated shape in the propagating direction of the guided light in the rib waveguide on a horizontal surface in a location serving as a boundary between the second low conductive region and the first doped region, covering a region serving as the first doped region, and exposing a region serving as the second low conductive region, and, in a case in which the rib waveguide includes the first low conductive region and the second low conductive region, producing the first resist or the second resist; and a resist trimming step of trimming the first resist or the second resist after the resist production step, thereby forming a resist having a resist side wall disposed in a corrugated shape in the propagating direction of the guided light in the rib waveguide on a horizontal surface in a location serving as the PN junction on a plan view of the substrate.

* * * * *